United States Patent
Kitazato

(10) Patent No.: US 8,938,756 B2
(45) Date of Patent: Jan. 20, 2015

(54) RECEIVING DEVICE, RECEIVING METHOD, PROGRAM, AND INFORMATION PROCESSING SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/559,188

(22) Filed: Jul. 26, 2012

(65) Prior Publication Data

US 2013/0198768 A1 Aug. 1, 2013

Related U.S. Application Data

(60) Provisional application No. 61/515,560, filed on Aug. 5, 2011.

(51) Int. Cl.
*H04N 5/445* (2011.01)
*G06F 3/00* (2006.01)
*G06F 13/00* (2006.01)
*H04H 60/32* (2008.01)
*H04N 21/442* (2011.01)
*H04H 60/56* (2008.01)
(Continued)

(52) U.S. Cl.
CPC ......... *H04N 21/442* (2013.01); *H04H 2201/37* (2013.01); *H04H 60/56* (2013.01); *G06F 13/00* (2013.01); *H04H 60/372* (2013.01); *G06K 9/00* (2013.01); *H04N 7/173* (2013.01)
USPC ............. 725/40; 725/19; 725/51; 725/60

(58) Field of Classification Search
CPC ............. H04N 21/65; H04N 21/6543; H04N 21/4351; H04N 21/23418; H04N 21/44008; H04H 60/59

USPC .......................... 725/61, 93, 23, 60
See application file for complete search history.

(56) References Cited

U.S. PATENT DOCUMENTS

2006/0031914 A1* 2/2006 Dakss et al. ............... 725/135
2006/0218618 A1* 9/2006 Lorkovic .................. 725/135
(Continued)

FOREIGN PATENT DOCUMENTS

JP 2002-300544 10/2002
JP 2007-534217 11/2007
(Continued)

OTHER PUBLICATIONS

U.S. Appl. No. 13/422,203, filed Mar. 16, 2012, Kitazato, et al.
(Continued)

*Primary Examiner* — Ricky Chin
*Assistant Examiner* — Akshay Doshi
(74) *Attorney, Agent, or Firm* — Oblon, Spivak, McClelland, Maier & Neustadt, L.L.P.

(57) ABSTRACT

A receiving device includes: a receiver configured to receive AV content; a feature extractor configured to extract a feature from data of the received AV content; an identification result acquirer configured to acquire an identification result of the AV content identified from the extracted feature by using an Automatic Content Recognition technique; a command acquirer configured to acquire a command for controlling operation of an application program run in conjunction with the AV content in accordance with the acquired identification result; and a controller configured to control operation of the application program in accordance with the acquired command.

15 Claims, 19 Drawing Sheets

(51) Int. Cl.
*G06K 9/00* (2006.01)
*H04N 7/173* (2011.01)
*H04H 60/37* (2008.01)

(56) References Cited

U.S. PATENT DOCUMENTS

| | | |
|---|---|---|
| 2007/0220564 A1 | 9/2007 | Yano et al. |
| 2008/0010342 A1* | 1/2008 | Gebhardt et al. ............. 709/204 |
| 2008/0263620 A1 | 10/2008 | Berkvens et al. |
| 2010/0225810 A1 | 9/2010 | Berkvens et al. |
| 2011/0075990 A1 | 3/2011 | Eyer |
| 2011/0088075 A1 | 4/2011 | Eyer |
| 2011/0209181 A1* | 8/2011 | Gupta et al. .................... 725/62 |
| 2011/0243536 A1 | 10/2011 | Eyer |
| 2011/0246488 A1 | 10/2011 | Eyer |
| 2011/0247028 A1 | 10/2011 | Eyer |
| 2011/0247044 A1* | 10/2011 | Jacoby .......................... 725/115 |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2011/0313856 A1* | 12/2011 | Cohen et al. ............... 705/14.49 |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0324495 A1* | 12/2012 | Matthews et al. ................ 725/14 |
| 2013/0239163 A1* | 9/2013 | Kim et al. ..................... 725/115 |

FOREIGN PATENT DOCUMENTS

| | | |
|---|---|---|
| JP | 2009-521169 | 5/2009 |
| JP | 2010-154523 | 7/2010 |
| JP | 2010-532943 | 10/2010 |

OTHER PUBLICATIONS

U.S. Appl. No. 13/304;126, filed Nov. 23, 2011, Eyer.
U.S. Appl. No. 13/452,376, filed Apr. 20, 2012, Kitahara, et al.
U.S. Appl. No. 13/490,216, filed Jun. 6, 2012, Eyer.
U.S. Appl. No. 13/554,688, filed Jul. 20, 2012, Kitahara, et al.
U.S. Appl. No. 13/527,435, filed Jun. 16, 2012, Eyer.
International Search Report issued Oct. 23, 2012 in corresponding International Application No. PCT/JP2012/068872 filed on Jul. 25, 2012 (with an English Translation).

* cited by examiner

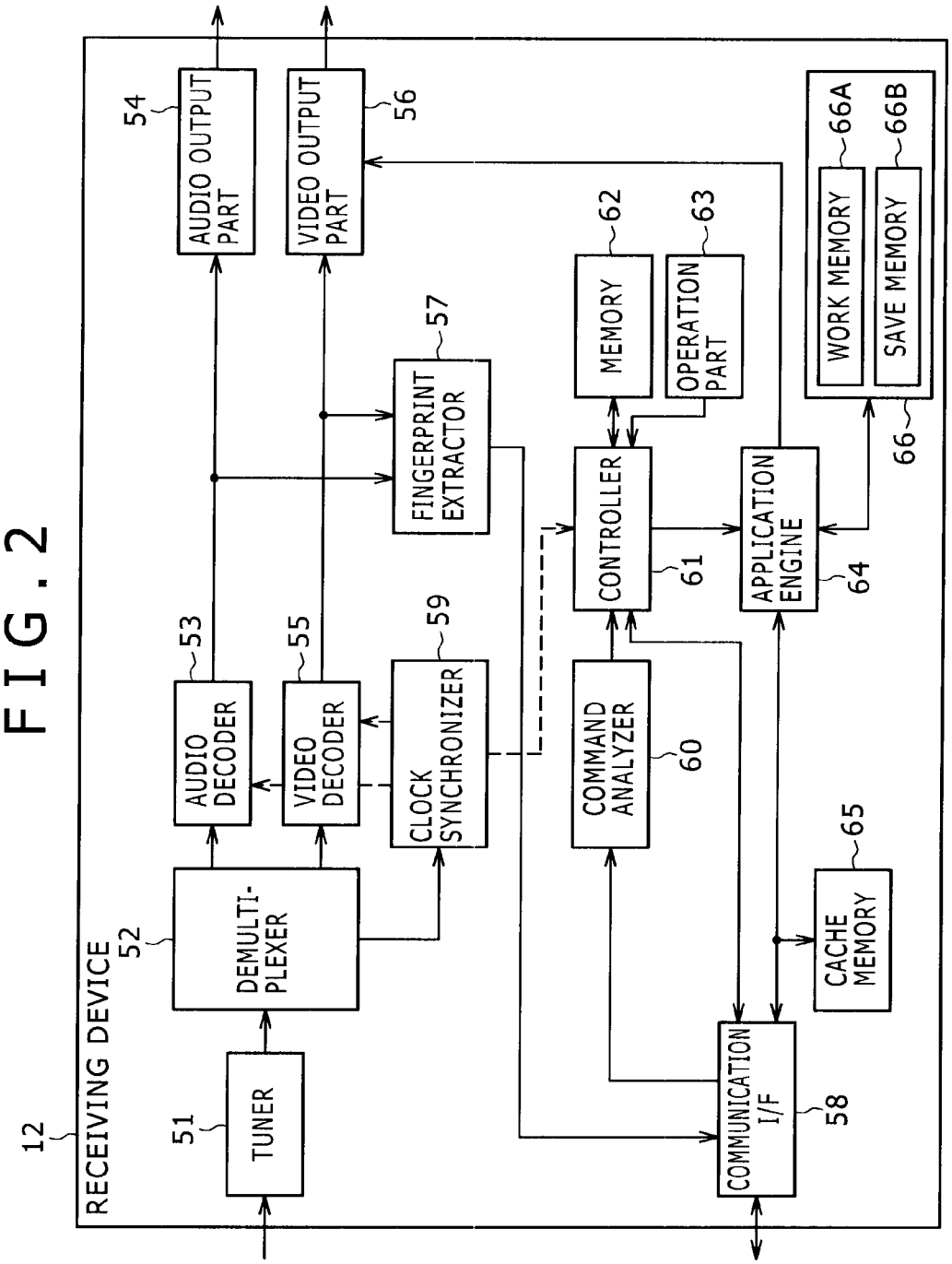

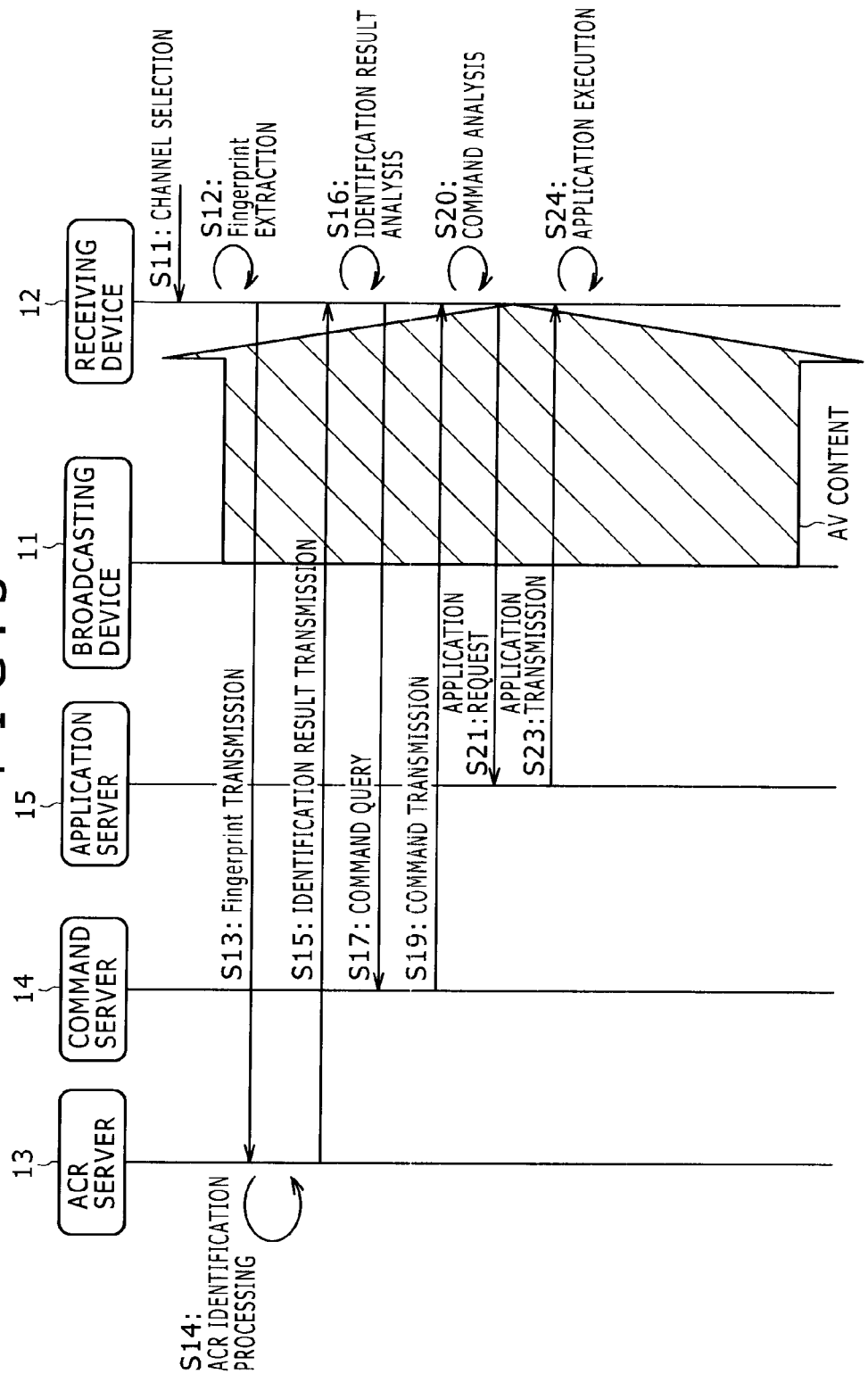

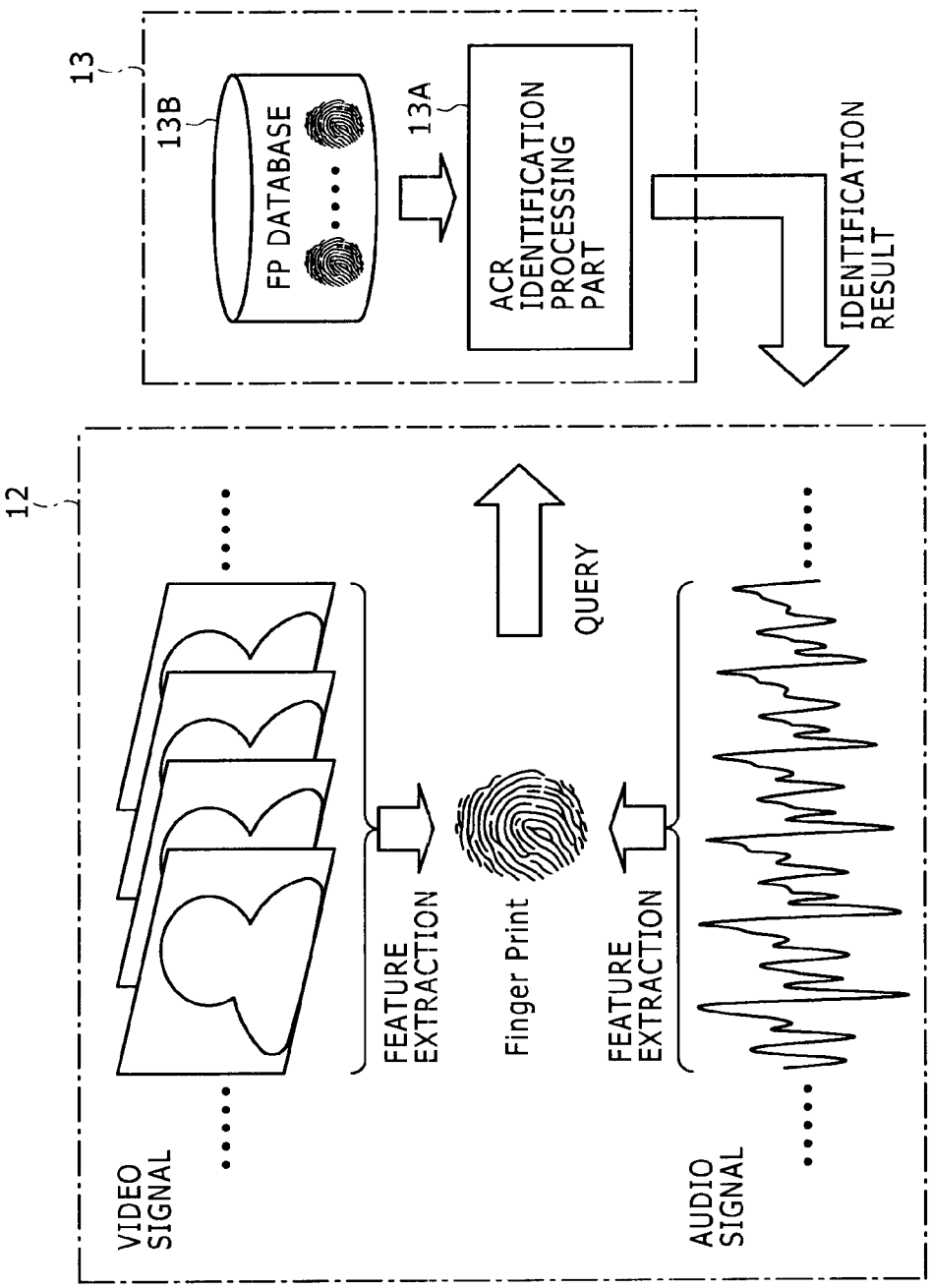

FIG. 5

| INFORMATION ITEMS | CONTENT |
|---|---|
| COMMAND ID | ID FOR IDENTIFICATION OF SPECIFIC COMMAND |
| COMMAND EFFECTIVE TIME | REPRESENTED BY ANY OF ABSOLUTE TIME AND DATE, RELATIVE TIME, AND PTS INDICATING TIME AT WHICH COMMAND IS EXECUTED. IF CURRENT TIME EXCEEDS THIS TIME, COMMAND IMMEDIATELY BECOMES EFFECTIVE. |
| COMMAND SUBJECT APPARATUS TYPE | SUBJECT APPARATUS OF APPLICATION CONTROL BY COMMAND. "RECEIVING DEVICE MAIN BODY", "EXTERNAL DEVICE TYPE 1", "EXTERNAL DEVICE TYPE 2" ··· |
| COMMAND ACTION | TERMINAL ACTION BY COMMAND IS INDICATED. FIVE TYPES OF "APPLICATION ACQUISITION", "APPLICATION ACTIVATION", "APPLICATION STOP", "EVENT FIRING", AND "APPLICATION INTERRUPTION". |
| COMMAND APPLICATION DECENTRALIZATION PARAMETER | PARAMETER FOR STOCHASTICALLY DECENTRALIZING TIMING OF COMMAND APPLICATION IN SUBJECT APPARATUS. IT AIMS AT DECENTRALIZATION OF ACCESS TO SERVERS. |
| APPLICATION ID | ID OF SUBJECT APPLICATION |
| APPLICATION TYPE | TYPE OF APPLICATION |
| BUSINESS OPERATOR ID | ID INDICATING BUSINESS OPERATOR (UNNECESSARY IF INCLUDED IN APPLICATION ID) |
| APPLICATION URL | URL OF ACQUISITION SOURCE OF APPLICATION |
| APPLICATION EXPIRATION DATE | LIMIT TIME AND DATE OF DELETION OF APPLICATION |
| APPLICATION RETENTION PRIORITY | RETENTION PRIORITY IF APPLICATION RETENTION CAPACITY IS INSUFFICIENT |
| EVENT ID | EVENT ID IN THE CASE OF "EVENT FIRING" |
| EVENT APPENDED DATA | DATA UTILIZED IN APPLICATION IN ASSOCIATION WITH EVENT FIRING IN THE CASE OF "EVENT FIRING" |

FIG. 6

| ELEMENT (ATTRIBUTE) | | | THE NUMBER OF TIMES OF APPEARANCE | DEFINITION AND DETAILED OPERATION |
|---|---|---|---|---|
| command | | | 1 | |
| | @destination | | 1 | COMMAND APPLICATION APPARATUS<br>"receiver": RECEIVING DEVICE MAIN BODY<br>"external_1" EXTERNAL DEVICE TYPE 1<br>"external_2" EXTERNAL DEVICE TYPE 2 |
| | @action | | 1 | COMMAND CONTENT<br>"execute" APPLICATION EXECUTION, "register" APPLICATION REGISTRATION,<br>"suspend" APPLICATION INTERRUPTION, "terminate" APPLICATION STOP,<br>"event" EVENT FIRING |
| timing | | | 0..1 | DETAILED SPECIFICATION OF COMMAND APPLICATION TIMING |
| | @unit | | 1 | TIMING SPECIFYING METHOD<br>"utc" ABSOLUTE TIME AND DATE, "smpte" RELATIVE TIME,<br>"pts" BROADCAST PTS VALUE |
| diffusion | | | 0..1 | DIFFUSION OF COMMAND APPLICATION TIMING |
| | @rate | | 1 | THE NUMBER OF TIMES OF DISTRIBUTION |
| | @range | | 1 | MAXIMUM DELAY TIME |
| | @period | | 1 | COMMAND APPLICATION DIFFUSION PERIOD |

FIG. 7

| ELEMENT (ATTRIBUTE) | | | THE NUMBER OF TIMES OF APPEARANCE | DEFINITION AND DETAILED OPERATION |
|---|---|---|---|---|
| application | | | 1 | DESCRIPTION OF SUBJECT APPLICATION |
| | @id | | 1 | APPLICATION ID |
| | @type | | 1 | APPLICATION TYPE |
| | @url | | 0...1 | URL OF ACQUISITION SOURCE OF APPLICATION INDISPENSABLE IF "execute" OR "register" |
| | @priority | | 0...1 | APPLICATION RETENTION PRIORITY 1: HIGH 0: NORMAL |
| | @expire_date | | 0...1 | APPLICATION EXPIRATION DATE INDISPENSABLE IF "execute" OR "register" |
| | event | | 0...1 | APPLICATION EVENT INDISPENSABLE IF "event" |
| | | @id | 1 | EVENT ID |
| | | data | 0...1 | DATA INPUT TO APPLICATION IN ASSOCIATION WITH EVENT |

FIG. 8

```
<command destination="receiver" action="execute">
  <timing unit="pts"> 1286743 </timing>
  <application id="1" type="html" url="xxx.com/yyy" expire_date="2011-01-21">
</command>
```

RECEIVING DEVICE, RECEIVING METHOD, PROGRAM, AND INFORMATION PROCESSING SYSTEM

CROSS-REFERENCE TO RELATED APPLICATION

This application claims the benefit of priority of Provisional Application Ser. No. 61/515,560, filed on Aug. 5, 2011, the entire contents of which is incorporated herein by reference.

BACKGROUND

The present technique relates to receiving devices, receiving methods, programs, and information processing systems, and particularly to a receiving device, a receiving method, a program, and an information processing system that are so configured as to allow provision of an application program that is in conjunction with a digital television show by use of an ACR technique.

In a receiving device that receives a digital television broadcast signal, it is expected that a service to acquire an application program that is in conjunction with a digital television show from the Internet and run the program will become widespread, and techniques for realizing such a hybrid service of broadcasting and communication are being studied (refer to e.g. Japanese Patent Laid-open No. 2006-245653).

Furthermore, studies are being made on realizing the hybrid service of broadcasting and communication by transmitting a control signal synchronized with a digital television broadcast signal in the case in which terrestrial broadcasting is not directly received but received via a community antenna television (CATV) network or a satellite communication network. However, currently realizing the service is difficult unless facilities and dedicated terminals of the CATV network or the satellite communication network are renewed.

SUMMARY

By the way, a technique called ACR (Automatic Content Recognition) to identify audio video (AV) content of a show or the like is known. In the ACR technique, AV content is identified by checking a feature extracted from a video signal and an audio signal of AV content as the identification subject against a database in which features extracted from a video signal and an audio signal of a large number of pieces of AV content are registered in advance.

If a digital television show is identified by using the ACR technique and an application program corresponding to the identified show can be provided, the hybrid service of broadcasting and communication can be realized. However, currently, a technical system for providing an application program that is in conjunction with a digital television show by using the ACR technique has not been established.

The present technique made in view of such circumstances and is to allow provision of an application program that is in conjunction with a digital television show by use of the ACR technique.

A receiving device of a first embodiment of the present technique includes a receiver that receives AV content, a feature extractor that extracts a feature from data of the received AV content, and an identification result acquirer that acquires an identification result of the AV content identified from the extracted feature by using an ACR (Automatic Content Recognition) technique. The receiving device further includes a command acquirer that acquires a command for controlling the operation of an application program run in conjunction with the AV content in accordance with the acquired identification result, and a controller that controls the operation of the application program in accordance with the acquired command.

The command indicates any of acquisition or registration, acquisition or activation, event firing, interruption, or stop of the application program. The controller controls acquisition or registration, or acquisition or activation of the application program, or event firing, suspension, and stop of the application program that is running, in accordance with each command.

Time information indicating time at which the command is executed is included in the command, and the controller executes the command in accordance with the time information.

The time information is information for executing the command at specific time set in advance irrespective of the progression of the AV content or information for executing the command when specific time set in advance elapses in conjunction with the progression of the AV content.

The controller acquires the application program and then activates the acquired application program when it is time to execute the command, if the command indicates acquisition or activation and the application program is not acquired.

The feature extractor extracts the feature from either one or both of a video signal and an audio signal of the AV content.

The receiving device may be an independent device or may be an internal block configuring one device.

A receiving method or a program of the first embodiment of the present technique is a receiving method or a program corresponding to the receiving device of the above-described first embodiment.

In the receiving device, the receiving method, and the program of the first embodiment of the present technique, the AV content is received and the feature is extracted from the data of the received AV content. The identification result of the AV content identified from the extracted feature by using the ACR technique is acquired, and the command for controlling the operation of the application program run in conjunction with the AV content is acquired in accordance with the acquired identification result. The operation of the application program is controlled in accordance with the acquired command.

An information processing system of a second embodiment of the present technique is composed of a receiving device, a first information processing device, a second information processing device, and a third information processing device. In the information processing system, the receiving device includes a receiver that receives AV content, a feature extractor that extracts a feature from data of the received AV content, and an identification result acquirer that transmits the extracted feature to the first information processing device and acquires an identification result of the AV content identified from the feature by using an ACR technique in the first information processing device. The receiving device further includes a command acquirer that transmits the identification result acquired from the first information processing device to the second information processing device and acquires, from the second information processing device, a command for controlling the operation of an application program run in conjunction with the AV content in accordance with the identification result, and a controller that controls the operation of the application program acquired from the third information processing device in accordance with the command acquired from the second information processing device. The first information processing device includes a content identifier that identifies the AV content from the feature by using the ACR technique in response to a query from the receiving device. The second information processing device includes a command provider that provides the command in accordance with the identification result in response to a query from the receiving device. The third information processing device includes an application provider that provides the application program in accordance with the command in response to a query from the receiving device.

In the information processing system of the second embodiment of the present technique, by the receiving device, the AV content is received and the feature is extracted from the data of the received AV content. The extracted feature is transmitted to the first information processing device and the identification result of the AV content identified from the feature by using the ACR technique in the first information processing device is acquired. The identification result acquired from the first information processing device is transmitted to the second information processing device and the command for controlling the operation of an application program run in conjunction with the AV content in accordance with the identification result is acquired from the second information processing device. The operation of the application program acquired from the third information processing device is controlled in accordance with the command acquired from the second information processing device. By the first information processing device, the AV content is identified from the feature by using the ACR technique in response to a query from the receiving device. By the second information processing device, the command in accordance with the identification result is provided in response to a query from the receiving device. By the third information processing device, the application program in accordance with the command is provided in response to a query from the receiving device.

According to the present technique, an application program that is in conjunction with a digital television show can be provided by using the ACR technique.

BRIEF DESCRIPTION OF THE DRAWINGS

FIG. 2 is a diagram showing a configuration example of a receiving device;

FIG. 3 is a sequence diagram for explaining processing of cooperation between the receiving device and the respective servers;

FIG. 4 is a diagram for explaining the concept of an ACR technique;

FIG. 5 is a diagram showing one example of items of information included in a command;

FIG. 6 is a diagram showing the detailed specification of the command;

FIG. 7 is a diagram showing the detailed specification of the command;

FIG. 8 is a diagram showing a description example of the command;

DETAILED DESCRIPTION OF THE PREFERRED EMBODIMENTS

Figure 1:
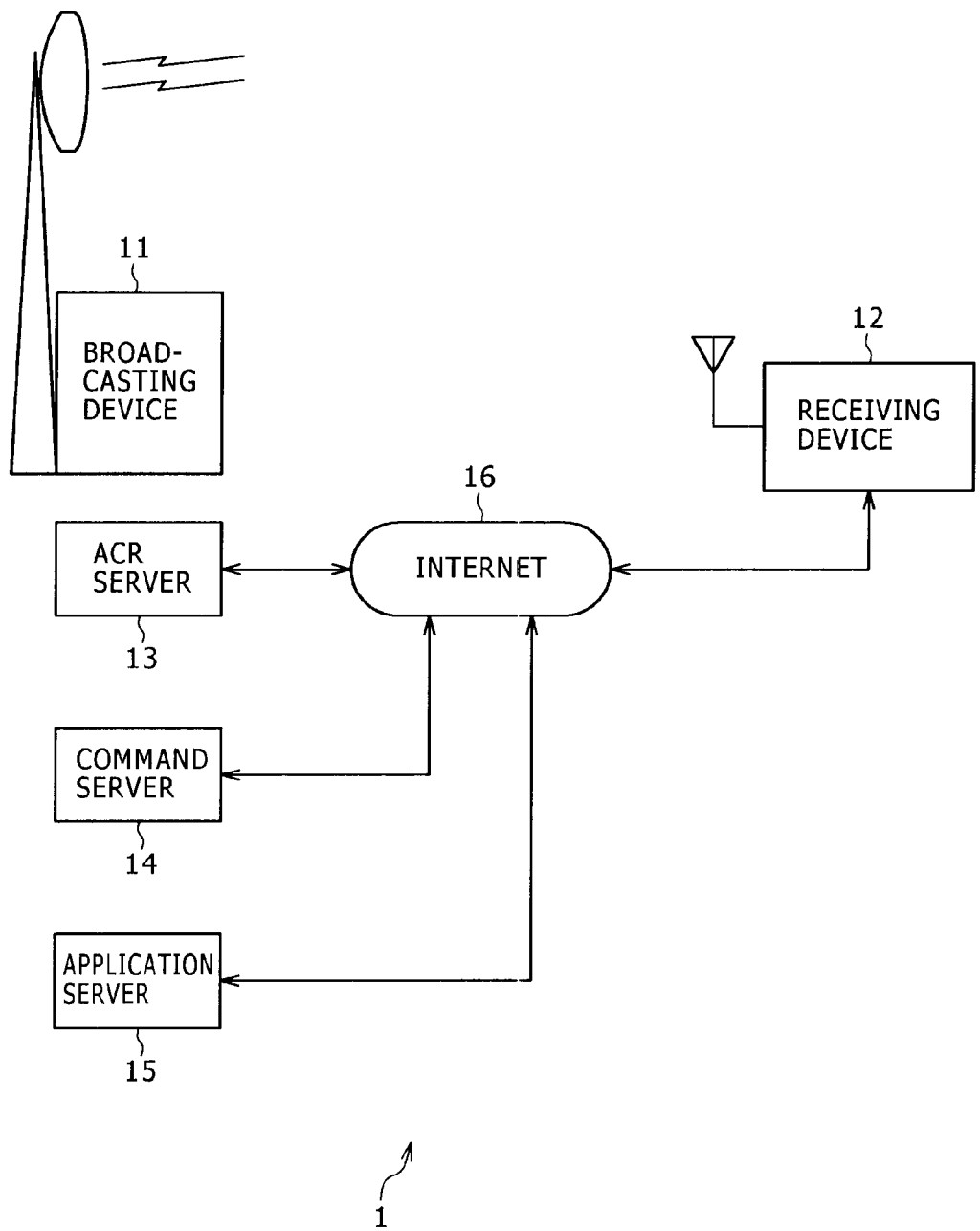
FIG. 1 is a diagram showing a configuration example of a broadcasting system.

Embodiments of the present technique will be described below with reference to the drawings.
<First Embodiment>
[Configuration Example of Broadcasting System]
FIG. 1 shows a broadcasting system 1 that is the present embodiment. This broadcasting system 1 is composed of a broadcasting device 11, a receiving device 12, an ACR server 13, a command server 14, and an application server 15. Furthermore, the receiving device 12, the ACR server 13, the command server 14, and the application server 15 are connected to each other via the Internet 16.

The broadcasting device 11 is so configured as to transmit (broadcast) a digital television broadcast signal of AV content equivalent to a digital television show.

The receiving device 12 receives the digital television broadcast signal transmitted from the broadcasting device 11 and acquires video and audio of the digital television show. The receiving device 12 outputs the acquired video to a monitor and outputs the audio to a speaker.

The receiving device 12 may exist as a single device or may be incorporated in a television receiver, a video recorder, etc. for example. Furthermore, the detailed configuration of the receiving device 12 will be described later with reference to FIG. 2.

In addition, the receiving device 12 periodically accesses the ACR server 13 via the Internet 16 and queries the identification result of the digital television show. At this time, a feature extracted from a video signal and an audio signal of the digital television show (hereinafter, referred to also as fingerprint information (Finger Print)) is transmitted to the ACR server 13.

The ACR server 13 has a database in which features extracted from a video signal and an audio signal of arbitrary AV content are registered and performs identification of AV content by use of an ACR (Automatic Content Recognition) technique in response to a query from an arbitrary terminal device connected to the Internet 16. The ACR server 13 checks the fingerprint information from the receiving device 12 against the database to thereby identify the digital television show, and transmits the identification result to the receiving device 12 via the Internet 16.

In accordance with the identification result received from the ACR server 13, the receiving device 12 accesses the command server 14 via the Internet 16 and acquires a command for controlling the operation of an application program for data broadcasting (hereinafter, referred to as the data broadcasting application), run in conjunction with the digital television show (AV content).

The command server 14 manages the command for controlling the operation of the data broadcasting application and transmits the command to the receiving device 12 via the Internet 16 in response to a query from the receiving device 12.

The receiving device 12 controls the operation of the data broadcasting application in accordance with the command received from the command server 14. Furthermore, in accordance with the command received from the command server 14, the receiving device 12 accesses the application server 15 via the Internet 16 and acquires the data broadcasting application.

The application server 15 manages the data broadcasting application executed in conjunction with the digital television show (AV content) broadcast by the broadcasting device 11, and transmits the data broadcasting application to the receiving device 12 via the Internet 16 in response to a query from the receiving device 12.

The broadcasting system 1 is configured in the above-described manner.

[Configuration Example of Receiving Device]

FIG. 2 shows a configuration example of the receiving device 12 in FIG. 1.

The receiving device 12 is composed of a tuner 51, a demultiplexer 52, an audio decoder 53, an audio output part 54, a video decoder 55, a video output part 56, a fingerprint extractor 57, a communication I/F 58, a clock synchronizer 59, a command analyzer 60, a controller 61, a memory 62, an operation part 63, an application engine 64, a cache memory 65, and an application memory 66.

The tuner 51 receives and demodulates a digital television broadcast signal corresponding to the channel selected by the user and outputs a transport stream (Transport Stream, hereinafter referred to as TS) obtained as a result to the demultiplexer 52.

The demultiplexer 52 separates the TS input from the tuner 51 into an audio encoded signal and a video encoded signal and outputs the respective signals to the audio decoder 53 and the video decoder 55. Furthermore, the demultiplexer 52 extracts PCR (Program Clock Reference) from a TS packet configuring the TS and supplies it to the clock synchronizer 59.

The audio decoder 53 decodes the input audio encoded signal and outputs an audio signal obtained as a result to the audio output part 54 and the fingerprint extractor 57. The audio output part 54 outputs the input audio signal to a speaker at the subsequent stage.

The video decoder 55 decodes the input video encoded signal and outputs a video signal obtained as a result to the video output part 56 and the fingerprint extractor 57. The video output part 56 outputs the video signal input from the video decoder 55 to a monitor at the subsequent stage.

To the fingerprint extractor 57, the audio signal from the audio decoder 53 and the video signal from the video decoder 55 are supplied. The fingerprint extractor 57 extracts a feature from either one or both of the audio signal and the video signal and supplies it to the communication I/F 58 as the fingerprint information.

The communication I/F 58 transmits the fingerprint information from the fingerprint extractor 57 to the ACR server 13 via the Internet 16. Furthermore, the communication I/F 58 receives the identification result of a digital television show transmitted from the ACR server 13 and supplies it to the controller 61.

The controller 61 runs a control program stored in the memory 62 in advance to thereby control the operation of the respective units of the receiving device 12. In the memory 62, the control program run by the controller 61 is stored in advance. This control program can be updated based on a digital television broadcast signal or update data acquired via the Internet 16. The operation part 63 accepts various kinds of operation from the user and notifies the controller 61 of an operation signal corresponding to it.

Furthermore, in accordance with the identification result from the communication I/F 58, the controller 61 controls the communication I/F 58 to access the command server 14 via the Internet 16 and query a command. The communication I/F 58 receives a command transmitted from the command server 14 and supplies it to the command analyzer 60.

The command analyzer 60 analyzes the command from the communication I/F 58 and supplies the analysis result to the controller 61.

The clock synchronizer 59 is configured with e.g. a PLL (Phase Locked Loop) and supplies a system clock according to the PCR from the demultiplexer 52 to the respective units of the receiving device 12, such as the audio decoder 53, the video decoder 55, and the controller 61. Thereby, in the receiving device 12, the system clock synchronized with the broadcasting device 11 can be obtained and therefore the audio signal and the video signal can be reproduced.

The controller 61 controls acquisition or registration, acquisition or activation (execution), event firing, interruption, stop, etc. of a data broadcasting application that is in conjunction with a digital television show (AV content) based on the analysis result from the command analyzer 60. Furthermore, based on the analysis result from the command analyzer 60, the controller 61 controls the timing of execution of the command on the basis of the system clock from the clock synchronizer 59.

An application engine 64 controls the communication I/F 58 to access the application server 15 via the Internet 16 and request a data broadcasting application in accordance with control by the controller 61. The communication I/F 58 receives a data broadcasting application transmitted from the application server 15 and retains it in the cache memory 65.

The application engine 64 reads out and executes the data broadcasting application retained in the cache memory 65 in accordance with control by the controller 61. The video signal of the running data broadcasting application is supplied to the video output part 56.

The video output part 56 combines the video signal input from the application engine 64 and the video signal input from the video decoder 55 and outputs the combined signal to the monitor at the subsequent stage.

The application memory 66 is composed of a work memory 66A and a save memory 66B. The application engine 64 records data relating to the running data broadcasting application (specifically, including the hierarchy of displayed information and so forth) in the work memory 66A. Furthermore, when suspending the running data broadcasting application, the application engine 64 moves the data in the work memory 66A of the application memory 66 to the save memory 66B. Then, when resuming the suspended data broadcasting application, the application engine 64 moves the data in the save memory 66B to the work memory 66A to restore the state before the suspension.

The receiving device 12 is configured in the above-described manner.

[Cooperation between Receiving Device and Respective Servers]

FIG. 3 is a sequence diagram for explaining processing of activating a data broadcasting application as one example of processing of cooperation between the receiving device 12 and the respective servers.

In the receiving device 12, when a desired channel is selected by the user, a digital television broadcast signal is received from the broadcasting device 11 and video of the corresponding digital television show is displayed on the monitor (S11). Furthermore, in the receiving device 12, features are periodically extracted from a video signal and an audio signal corresponding to the digital television show (S12), and these features are transmitted to the ACR server 13 as the fingerprint information (S13).

The ACR server 13 executes ACR identification processing to identify the digital television show currently selected in the receiving device 12 by checking the fingerprint information from the receiving device 12 against the database (S14). Specifically, as shown in FIG. 4, in the ACR server 13, when a query by the fingerprint information is received from the receiving device 12, the fingerprint information is checked against an FP database 13B prepared in advance by an ACR identification processing part 13A and the digital television show currently selected in the receiving device 12 is identified.

The fingerprint information (feature) is e.g. specific information of the whole or a partial constituent element of AV content, and the specific information of a large number of pieces of AV content is registered in the FP database 13B in advance. In the ACR identification processing, e.g. the degree of similarity or the degree of matching of these pieces of specific information is determined. As the method for determining the degree of similarity or the degree of matching, a publicly-known technique disclosed by various kinds of documents and so forth can be used. By using the ACR technique, AV content can be identified from the feature of a video signal and an audio signal without depending on information such as the resolution, the aspect ratio, the bit rate, or the format of the AV content.

By this ACR identification processing, information indicating the channel number of the digital television show (hereinafter, referred to as the channel number information) and information indicating the time position at which the fingerprint information is extracted when the period from the start to the end of the digital television show is represented on the time axis (hereinafter, referred to as the time position information) are obtained. Furthermore, in the FP database 13B, information indicating the acquisition source of a command for controlling the operation of a data broadcasting application executed in conjunction with the show (hereinafter, referred to as the command provider information) is stored in association with the channel number information. As the command provider information, e.g. the URL (Uniform Resource Locator) of the command server 14 is described.

The ACR identification processing part 13A acquires the command provider information corresponding to the identified channel number from the FP database 13B. Subsequently, the ACR identification processing part 13A transmits the channel number information, the time position information, and the command provider information to the receiving device 12 that is the query issuer as the identification result of the identification processing (S15).

The receiving device 12 acquires the identification result from the ACR server 13 and analyzes the identification result (S16). Furthermore, in accordance with the analysis result of the identification result, the receiving device 12 accesses the command server 14 having the URL described in the command provider information and transmits the channel number information and the time position information to thereby query the command that can be executed in the receiving device 12 (S17).

In response to the query from the receiving device 12, the command server 14 transmits the command according to the channel number information and the time position information to the receiving device 12 (S19).

The receiving device 12 acquires the command from the command server 14 and analyzes the command (S20). Furthermore, in accordance with the analysis result of the command, the receiving device 12 accesses the application server 15 and requests a data broadcasting application executed in conjunction with the currently-selected digital television show (S21).

The application server 15 transmits the data broadcasting application to the receiving device 12 in response to the application request from the receiving device 12 (S23).

The receiving device 12 acquires the data broadcasting application from the application server 15 and executes (activates) this data broadcasting application (S24).

As described above, by the cooperation between the receiving device 12 and the ACR server 13, the command server 14, and the application server 15, the data broadcasting application that is in conjunction with the currently-selected digital television show is activated in the receiving device 12.

[Details of Command]

FIG. 5 shows one example of items of information included in the command.

"Command ID" is information for identification of this command. If a command of the same content is transmitted plural times, the command ID of the respective commands is the same.

"Command effective time" is specified by any of "absolute time and date," "relative time," or "PTS" indicating the time at which this command is executed. "Absolute time and date" is specified if the command is executed when the current time and date become specific time and date set in advance irrespective of the progression of the digital television show. Furthermore, "relative time" is specified if the command is executed when specific time elapses from the time as the basis in the digital television show. For example, as the relative time, relative time from the start time of the digital television show is specified. In addition, "PTS" is specified if the command is executed by using a PTS (Presentation Time Stamp), which is time information for performing synchronous reproduction. That is, besides a system of specifying the command effective time based on hour, minute, and second, a system of specifying it based on the STC (System Time Clock) value of the TS can be employed.

If the current time has already exceeded the command effective time, this command is immediately executed when being received.

In "command subject apparatus type," apparatus as the subject of data broadcasting application control by this command is specified. Here, besides the receiving device main body (receiving device 12), if an external device is connected to the receiving device 12, this external device is specified as the subject apparatus of the command.

"Command action" indicates which of the following this command is: "application acquisition" (Register), "application activation" (Execute), "application stop" (Terminate), "event firing" (Inject_event), and "application interruption" (Suspend).

The register (Register) command is a command for instructing the receiving device 12 to acquire or register a data broadcasting application. Here, the registration of a data broadcasting application means that the priority and expiration date of the acquired data broadcasting application are stored in association with the data broadcasting application.

The data broadcasting application is managed by the controller 61 in accordance with the priority and the retention time limit.

The execute (Execute) command is a command for instructing the receiving device 12 to acquire or activate a data broadcasting application.

The terminate (Terminate) command is a command for making the receiving device 12 stop the running data broadcasting application.

The inject event (Inject_event) command is a command for making the receiving device 12 fire an event in the running data broadcasting application.

The suspend (Suspend) command is a command for making the receiving device 12 suspend the running data broadcasting application.

"Command application decentralization parameter" is a parameter for stochastically decentralizing the timing at which this command is applied in the subject apparatus such as the receiving device 12. By this parameter, the timing of access to the command server 14 and the application server 15 is adjusted. Therefore, it is possible to decentralize the access to the servers and reduce the burden.

"Application ID" is identification information of the data broadcasting application corresponding to this command. "Application type" is information indicating the type of the data broadcasting application corresponding to this command. "Business operator ID" is identification information of the business operator (e.g. broadcast station etc.) that carries out an execution service of the data broadcasting application corresponding to this command.

"Application URL" is information indicating the URL of the acquisition source of the data broadcasting application if the command action is "application acquisition" or "application activation." "Application Expiration Date" is information indicating the expiration date of the data broadcasting application. Furthermore, "application retention priority" is information indicating the priority when the data broadcasting application corresponding to this command is acquired and retained. If the data broadcasting application is registered, the application expiration date and the priority of retention of the data broadcasting application are stored. The data broadcasting application is managed in accordance with these expiration date and priority.

"Event ID" is identification information of the event that should be fired in the data broadcasting application specified by the application ID if the command action is "event firing." Furthermore, in "event appended data," data referenced in event firing if the command action is "event firing" is described.

Here, the detailed specification of the command is shown in FIG. 6 and FIG. 7.

A command element mainly includes, besides a destination attribute and an action attribute, a timing element, a diffusion element, an application element, and an event element.

The destination attribute corresponds to "command subject apparatus type" in FIG. 5. For example, in the destination attribute, "receiver" is specified if the subject apparatus of the command is the receiving device 12, and "external_1" or "external_2" is specified if the subject apparatus of the command is an external device.

The action attribute corresponds to "command action" in FIG. 5. For example, in the action attribute, "execute" is specified if acquisition or activation of the data broadcasting application is ordered. "Register" is specified if acquisition or registration of the data broadcasting application is ordered, and "suspend" is specified if interruption of the data broadcasting application is ordered. Moreover, in the action attribute, "terminate" is specified if stop of the data broadcasting application is ordered, and "event" is specified if an event is fired in the running data broadcasting application.

The timing element corresponds to "command effective time" in FIG. 5. There is a unit attribute as an attribute of the timing element. For example, in the unit attribute, "utc" is specified if "absolute time and date" is used. In addition, "smpte" is specified if "relative time" is used, and "pts" is specified if "PTS" is used.

The diffusion element corresponds to "command application decentralization parameter" in FIG. 5. There are a rate attribute, a range attribute, and a period attribute as attributes of the diffusion element, and the number of times of distribution, the maximum delay time, and the command application diffusion period, respectively, are specified.

The application element corresponds to "application ID," "application type," "application URL," "application retention priority," and "application expiration date" in FIG. 5, and an id attribute, a type attribute, an url attribute, a priority attribute, and an expire_date attribute are specified. The url attribute and the expire_date attribute are indispensable items if the action attribute is "execute" or "register." Furthermore, in the priority attribute, "0" is normally specified and "1" is specified if the priority is set high.

The event element corresponds to "event ID" and "event appended data" in FIG. 5, and an id attribute and a data attribute are specified. The event element is an indispensable item if the action attribute is "event."

[Description Example of Command]

FIG. 8 is a diagram showing a description example of the command.

In the example of FIG. 8, in the command element, "receiver" is specified as the destination attribute and "execute" is specified as the action attribute. That is, this command is the execute command addressed to the receiving device 12.

The timing element and the application element are described between the start tag and end tag of the command element.

In the timing element, "pts" is specified as the unit attribute and "1286743" is specified as its value. That is, this command is executed when the clock that is "1286743" passes.

In the application element, "1" is specified as the id attribute and "html" is specified as the type attribute. Furthermore, "xxx.com/yyy" is specified as the url attribute and "2011-01-21" is specified as the expire_date attribute. That is, this means that a data broadcasting application described by the HTML (Hyper Text Markup Language) can be acquired from the application server 15 specified by the URL that is "xxx.com/yyy."

The method for describing the command is arbitrary and is not limited to FIG. 8.

[State Transition of Data Broadcasting Application]

Figure 9:
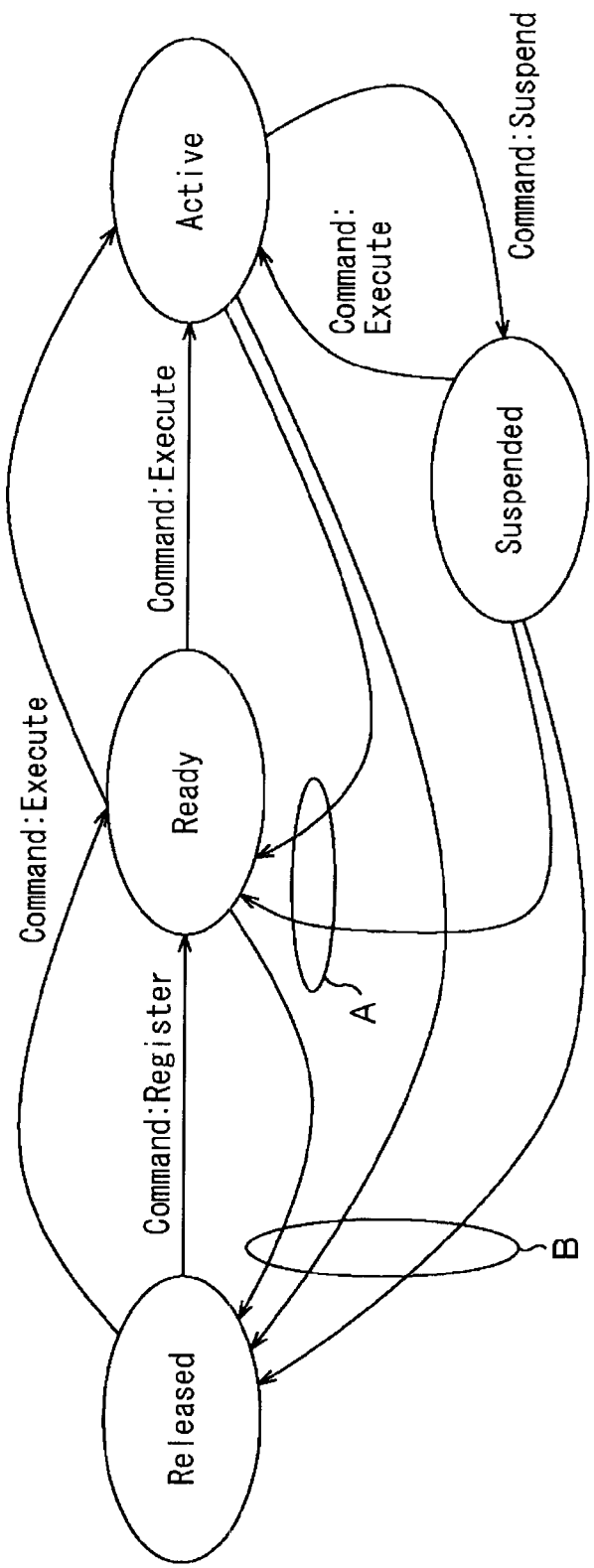
FIG. 9 is a diagram showing state transition of an application.

FIG. 9 is a state transition diagram of a data broadcasting application that operates in the receiving device 12 in response to the respective commands of register, execute, inject event, suspend, and terminate. As shown in this diagram, it is defined that the state of the data broadcasting application has transitioned to any of four kinds of states, i.e. released state (Released), ready state (Ready), active state (Active), and suspended state (Suspended).

The released state refers to the state in which the data broadcasting application has not yet been acquired into the receiving device 12. The ready state refers to the state in which the data broadcasting application has been registered into the receiving device 12 and is not activated. The active state refers to the state in which the data broadcasting application is activated and running. The suspended state refers to the state in which the execution of the data broadcasting application is interrupted and information indicating the state of the interruption timing is retained in the save memory 66B.

When the data broadcasting application has transitioned to the released state (has not yet been acquired into the receiving device 12), transition to the ready state occurs if the register command is received and the data broadcasting application is acquired (registered) in accordance with the register command.

When the data broadcasting application is in the ready state, transition to the active state occurs if the execute command is received and the data broadcasting application is activated in accordance with the execute command.

Furthermore, when the data broadcasting application has transitioned to the released state (has not yet been acquired into the receiving device 12), transition to the active state occurs if the execute command is received and the data broadcasting application is acquired and activated in accordance with the execute command.

When the data broadcasting application has transitioned to the active state, transition to the suspended state occurs if the suspend command is received and the running data broadcasting application is interrupted in accordance with the suspend command.

When the data broadcasting application has transitioned to the suspended state, transition to the active state occurs if the execute command is received and the interrupted data broadcasting application is resumed in accordance with the execute command.

When the data broadcasting application has transitioned to the active state or the suspended state, transition to the ready state occurs if the terminate command is received and the running data broadcasting application is stopped in accordance with the terminate command ("A" in the diagram). Besides the transition based on the terminate command, the transition to the ready state occurs also when another data broadcasting application is executed, and so forth.

Furthermore, when the data broadcasting application has transitioned to the ready state, the active state, or the suspended state, transition to the released state occurs when the application expiration date of the command passes ("B" in the diagram).

Figure 10:
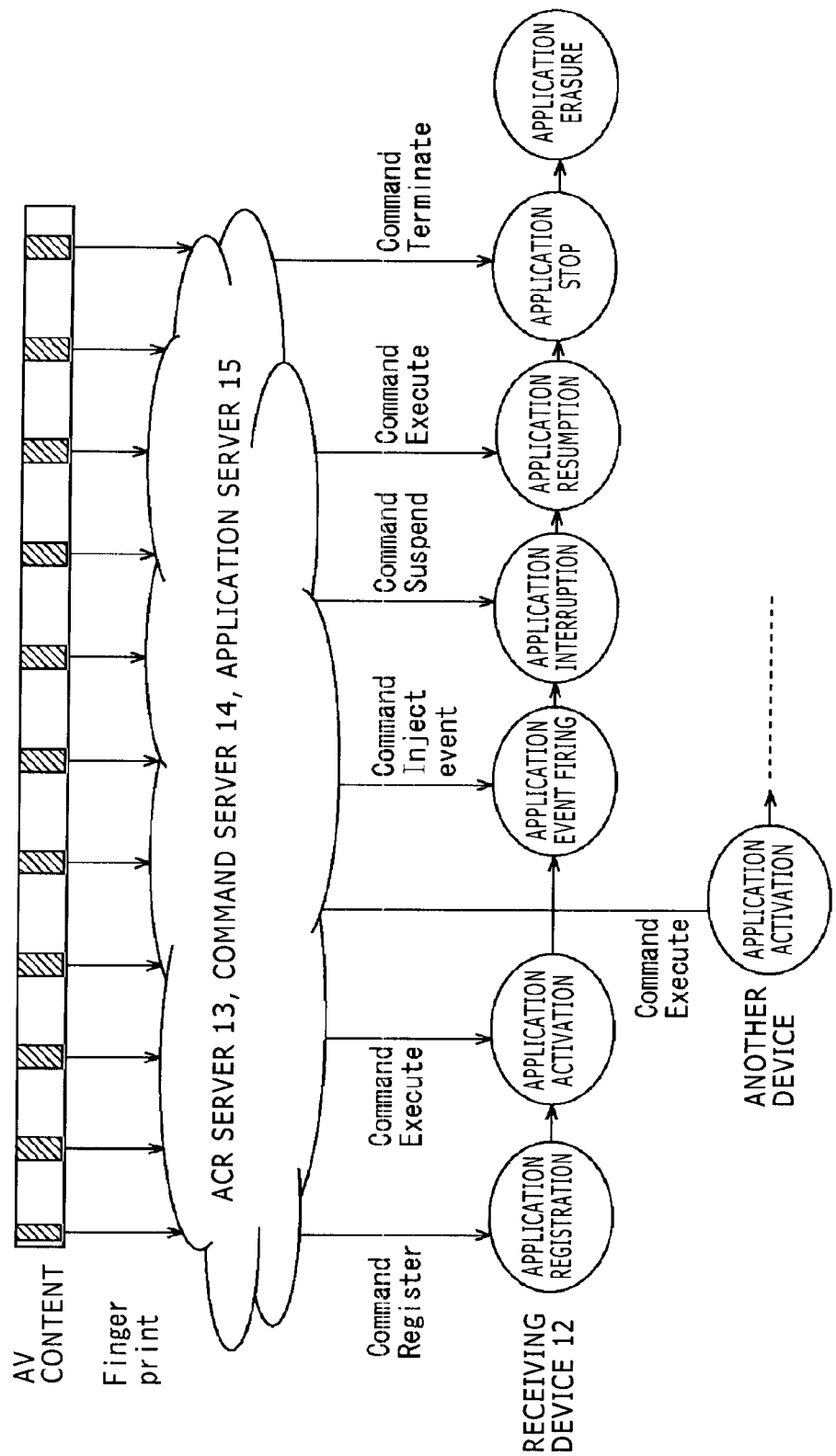
FIG. 10 is a diagram showing the relationship between the respective commands and the state transition.

FIG. 10 shows the relationship among the respective commands and the state transition.

FIG. 10 schematically shows how, in the receiving device 12, various kinds of commands are acquired from the command server 14 and a data broadcasting application is acquired from the application server 15 when the fingerprint information extracted from the data of AV content such as a digital television show is transmitted to the ACR server 13.

In the receiving device 12, when the data broadcasting application has transitioned to the released state (has not yet been acquired into the receiving device 12), transition to the ready state occurs if the data broadcasting application is acquired and retained to be registered in response to the register command.

In the receiving device 12, when the data broadcasting application is in the ready state, transition to the active state occurs if the data broadcasting application is activated in response to the execute command.

Furthermore, in another device other than the receiving device 12, when a data broadcasting application has transitioned to the released state (has not yet been acquired into another device), transition to the active state occurs if the data broadcasting application is acquired and activated in response to the execute command.

In the receiving device 12, when the data broadcasting application has transitioned to the active state, the state remains the active state if an event is fired in the running data broadcasting application in response to the inject event command.

In the receiving device 12, when the data broadcasting application has transitioned to the active state, transition to the suspended state occurs if the running data broadcasting application is interrupted in response to the suspend command. Furthermore, in the receiving device 12, when the data broadcasting application has transitioned to the suspended state, transition to the active state occurs if the interrupted data broadcasting application is resumed in response to the execute command.

Furthermore, in the receiving device 12, when the data broadcasting application has transitioned to the active state, transition to the ready state occurs if the running data broadcasting application is stopped in response to the terminate command. When the data broadcasting application has transitioned to the ready state, the active state, or the suspended state, if the application expiration date of this data broadcasting application passes, this data broadcasting application is erased from the cache memory 65 and the registration is deleted, so that transition to the released state occurs.

[Command Response Processing]

Next, a description will be made below about command response processing when the receiving device 12 receives a command with reference to FIG. 11.

Figure 11:
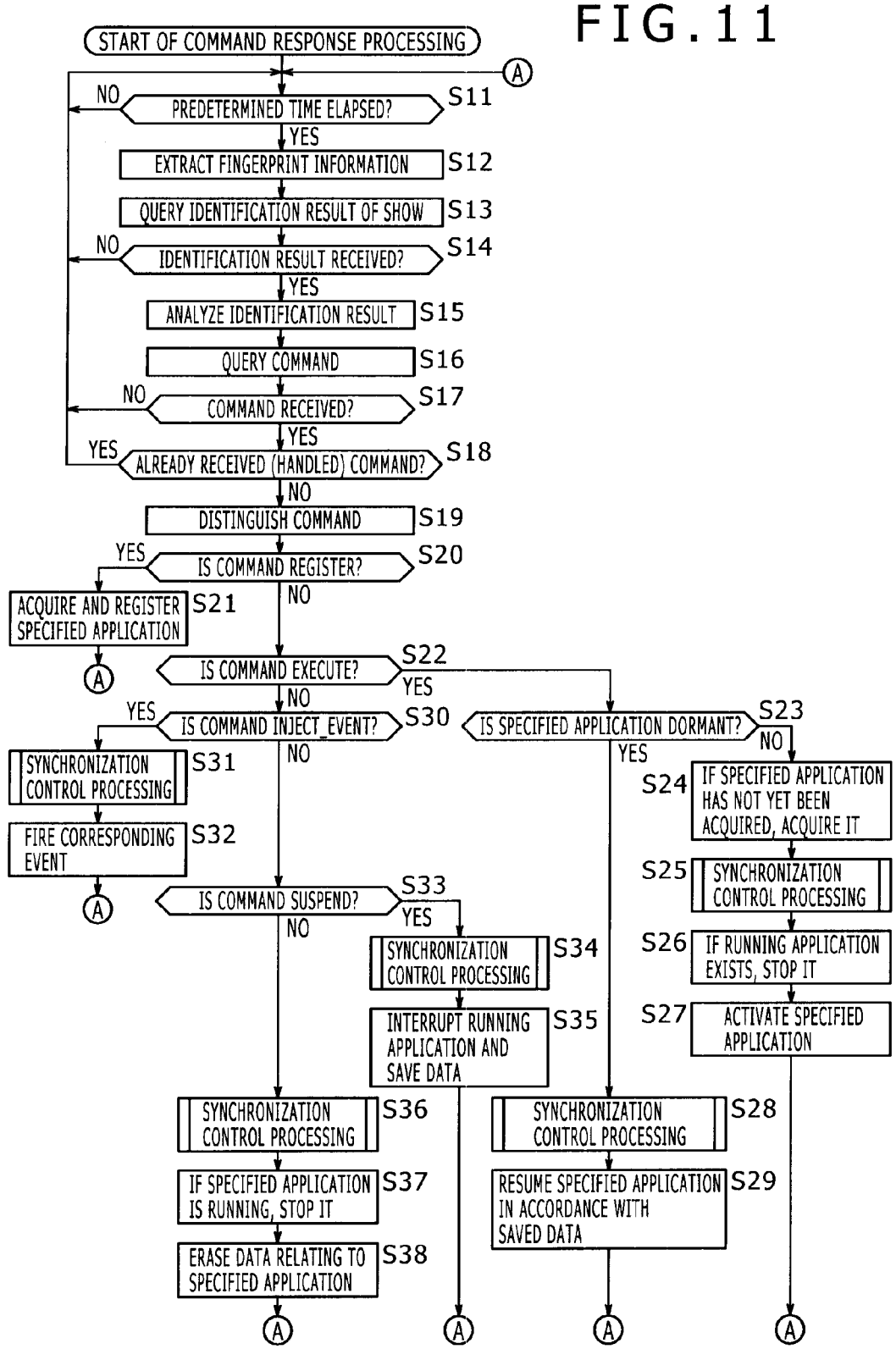
FIG. 11 is a flowchart showing command response processing.

FIG. 11 is a flowchart for explaining the command response processing. This command response processing is repeatedly executed when the user is watching a digital television show, i.e. while the receiving device 12 receives the digital television broadcast signal.

The fingerprint extractor 57 determines whether or not a predetermined time has elapsed in a step S11, and extracts the fingerprint information from video signal and audio signal corresponding to the digital television show after waiting for the elapse of the predetermined time (step S12). That is, the fingerprint extractor 57 periodically performs the extraction of the fingerprint information at a predetermined interval such as several seconds.

In a step S13, the fingerprint extractor 57 controls the communication I/F 58 to transmit the extracted fingerprint information to the ACR server 13 via the Internet 16 and query the identification result of the currently-selected digital television show. The ACR identification processing is executed based on the fingerprint information in the ACR server 13, and the identification result thereof is transmitted to the receiving device 12. If the identification result of the digital television show is no obtained in the ACR server 13, the transmission of the identification result is not performed.

In a step S14, the controller 61 controls the communication I/F 58 to determine whether or not the identification result is received from the ACR server 13 as the query subject of the identification result.

If it is determined in the step S14 that the identification result is not received, the processing returns to the step S11 and the subsequent processing is repeated. For example, if the fingerprint information is extracted when a channel on which broadcasting is currently suspended is selected in the receiving device 12, the show cannot be identified on the side of the ACR server 13 and the transmission of the identification result is not performed. (It is also possible that the identification result is transmitted but indicates the absence of the corresponding show.)

On the other hand, if it is determined in the step S14 that the identification result is received, the processing is forwarded to a step S15. In the step S15, the controller 61 analyzes the identification result of the currently-selected digital television show, received by the communication I/F 58. Here, as the identification result, the channel number information, the time position information, and the command provider information of the currently-selected digital television show are obtained.

In a step S16, the controller 61 controls the communication I/F 58 to access the command server 14 corresponding to the URL indicated by the command provider information and transmit the channel number information and the time position information. Thereby, the controller 61 queries the command that can be executed in the receiving device 12. In the command server 14, the command that can be executed in the time zone corresponding to the time position information in the digital television show corresponding to the channel number information is acquired and transmitted to the receiving device 12.

In a step S17, the controller 61 controls the communication I/F 58 to determine whether or not a command is received from the command server 14 as the query subject of the command.

If it is determined in the step S17 that a command is not received, the processing returns to the step S11 and the subsequent processing is repeated. For example, in the command server 14, the transmission of a command is not performed if the command that matches the condition defined by the channel number information and the time position information does not exist. (It is also possible that a command is transmitted but indicates that the processing is unnecessary.)

On the other hand, if it is determined in the step S17 that a command is received, the processing is forwarded to a step S18. In the step S18, the command analyzer 60 reads out the command ID included in the command and determines whether or not the processing of a step S19 and subsequent steps has been already executed for this command. If it is determined that the processing of the step S19 and subsequent steps has been already executed, the processing returns to the step S11 and the subsequent processing is repeated. On the other hand, if it is determined that the processing of the step S19 and subsequent steps has not been executed for this command, the processing is forwarded to the step S19.

In the step S19, the command analyzer 60 reads out the command action included in the command and distinguishes which of the following this command is: Register, Execute, Terminate, Inject_event, or Suspend.

In a step S20, the command analyzer 60 determines whether or not the distinguishing result of the step S19 is Register. If it is determined that the distinguishing result is Register, the processing is forwarded to a step S21.

In the step S21, the controller 61 controls the communication I/F 58 to access the application server 15 corresponding to the application URL of this command and make the communication I/F 58 acquire the data broadcasting application specified by the application ID. The data broadcasting application acquired by the communication I/F 58 is retained in the cache memory 65. Furthermore, in association with the acquired data broadcasting application, the controller 61 stores its application expiration date and application retention priority in the memory 62. Thereby, the data broadcasting application retained in the cache memory 65 is managed by the controller 61 in accordance with the expiration date and the retention priority.

Thereafter, the processing returns to the step S11 and the subsequent processing is repeated.

If it is determine in the step S20 that the determination result of the step S19 is not Register, the processing is forwarded to a step S22. In the step S22, the controller 61 determines whether or not the determination result of the step S19 is Execute. If it is determined that the determination result is Execute, the processing is forwarded to a step S23.

In the step S23, the application engine 64 determines whether or not the data broadcasting application specified by the command ID of this command is dormant (in the suspended state) in accordance with control from the controller 61. Specifically, the application engine 64 determines that the data broadcasting application is dormant if data indicating the suspended state of the data broadcasting application specified by the command ID is saved in the save memory 66B.

If it is determined in the step S23 that the data broadcasting application specified by the command ID is not dormant, the processing is forwarded to a step S24. In the step S24, in accordance with control from the controller 61, the application engine 64 acquires the data broadcasting application specified by the command ID if it has not yet been acquired (does not exist in the cache memory 65).

In a step S25, the controller 61 executes synchronization control processing. Here, the details of the synchronization control processing will be described with reference to a flowchart of FIG. 12.

In a step S51, the controller 61 determines whether or not the command effective time included in this command is set.

If it is determined in the step S51 that the command effective time is set, the processing is forwarded to a step S52. In the step S52, the controller 61 determines whether or not it is time to execute the command.

This command effective time is specified by e.g. "absolute time and date," "relative time," or "PTS." In the determination processing of the step S52, if "absolute time and date" is specified, it is determined whether or not the current time and date have become specific time and date set in advance. Furthermore, if "relative time" is specified, for example it is determined whether or not specific time set in advance has elapsed from the start time of the digital television show. Moreover, if "PTS" is specified, it is determined whether or not it is time to execute the command based on the clock from the clock synchronizer 59.

In the determination processing of the step S52, the determination processing is repeated until it is determined that it is time to execute the command. That is, execution of this command is awaited until it is time to execute the command.

Then, if it is determined in the step S52 that it is time to execute the command, the processing is returned to the step S25 in FIG. 11 and the subsequent processing is executed.

In a step S26, if a currently-running data broadcasting application exits, the application engine 64 stops it in accordance with control from the controller 61. Then, in a step S27, the application engine 64 activates the data broadcasting application specified by the command ID in accordance with control from the controller 61.

That is, due to the execution of the synchronization control processing of the step S25 (FIG. 12), the data broadcasting application is activated after the passage of the time at which this command is executed. Thus, for example it is possible to activate the data broadcasting application in association with the progression of the digital television show or to activate the data broadcasting application in a certain specific time zone.

Figure 12:
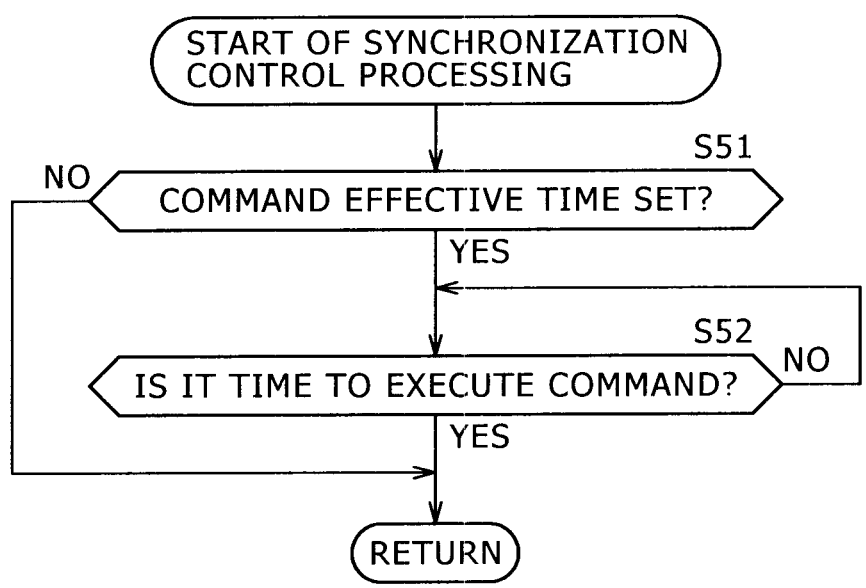
FIG. 12 is a flowchart showing synchronization control processing.

Furthermore, if the command effective time is not set ("No" of the step S51 in FIG. 12), the step S52 in FIG. 12 is skipped, and the steps S26 and S27 are carried out immediately after the end of the acquisition processing of the step S24. In this case, after the data broadcasting application that has not yet been acquired is acquired, immediately this data broadcasting application is activated.

Thereafter, the processing returns to the step S11 and the subsequent steps are repeated.

Furthermore, if it is determined in the step S23 that the data broadcasting application specified by the command ID is dormant (in the suspended state), the processing is forwarded to a step S28.

In the step S28, the controller 61 executes the synchronization control processing of FIG. 12. That is, if the command effective time is set, processing of a step S29 is executed when it is time to execute the command. If the command effective time is not set, immediately the processing of the step S29 is executed.

In the step S29, the application engine 64 moves data in the save memory 66B to the work memory 66A and activates the data broadcasting application specified by the command ID in accordance with control from the controller 61. Thereby, the dormant data broadcasting application specified by the command ID is resumed from the suspended state. Thereafter, the processing returns to the step S11 and the subsequent steps are repeated.

If it is determined in the step S22 that the distinguishing result of the step S19 is not Execute, the processing is forwarded to a step S30. In the step S30, the controller 61 determines whether or not the distinguishing result of the step S19 is Inject_event. If it is determined that the distinguishing result is Inject_event, the processing is forwarded to a step S31.

In the step S31, the controller 61 executes the synchronization control processing of FIG. 12. That is, if the command effective time is set, processing of a step S32 is executed when it is time to execute the command. If the command effective time is not set, immediately the processing of the step S32 is executed.

In the step S32, only when the command ID of this command corresponds with the command ID of the operating data broadcasting application, the controller 61 controls the application engine 64 to fire (execute) the event corresponding to the event ID of the command in the operating data broadcasting application. Thereafter, the processing returns to the step S11 and the subsequent steps are repeated.

If it is determined in the step S30 that the distinguishing result of the step S19 is not Inject_event, the processing is forwarded to a step S33. In the step S33, the controller 61 determines whether or not the distinguishing result of the step S19 is Suspend. If it is determined that the distinguishing result is Suspend, the processing is forwarded to a step S34.

In the step S34, the controller 61 executes the synchronization control processing of FIG. 12. That is, if the command effective time is set, processing of a step S35 is executed when it is time to execute the command. If the command effective time is not set, immediately the processing of the step S35 is executed.

In the step S35, the application engine 64 saves, in the save memory 66B, data indicating the state of the currently-running data broadcasting application (i.e. data currently written to the work memory 66A, including information indicating the hierarchy of the displayed information if a hierarchical structure exists in the displayed information) in accordance with control from the controller 61. Thereafter, the processing returns to the step S11 and the subsequent steps are repeated.

If it is determined in the step S33 that the distinguishing result of the step S19 is not Suspend, the distinguishing result of the step S19 is Terminate and thus the processing is forwarded to a step S36.

In the step S36, the controller 61 executes the synchronization control processing of FIG. 12. That is, if the command effective time is set, processing of a step S37 is executed when it is time to execute the command. If the command effective time is not set, immediately the processing of the step S37 is executed.

In the step S37, if the data broadcasting application specified by the command ID is running, the application engine 64 stops it, in accordance with control from the controller 61. In a step S38, in accordance with control from the controller 61, the application engine 64 erases data relating to the data broadcasting application specified by the command ID from the work memory 66A and the save memory 66B and erases the data broadcasting application from the cache memory 65. Thereafter, the processing returns to the step S11 and the subsequent steps are repeated.

This is the end of the description of the command response processing. The above-described command response processing enables activation of a data broadcasting application, event firing, and stop of the data broadcasting application in conjunction with AV content (e.g. digital television show, CM, etc.) of television broadcasting. Moreover, a data broadcasting application can be suspended in such a manner that the state immediately before suspend is kept, and another data broadcasting application can be executed and stopped. Thereafter, the suspended data broadcasting application can be resumed from the suspended state.

Furthermore, executing the command response processing makes it possible to provide a data broadcasting application that is in conjunction with a digital television show by using the ACR technique.

In the example of FIG. 11, it is explained that, in the steps S24 to S27, the data broadcasting application that has not yet been acquired is acquired (S24) and thereafter the acquired data broadcasting application is activated when it is time to execute the command (S25). However, the order of the processing of the steps S24 and S25 may be reversed. That is, in this case, the data broadcasting application that has not yet been acquired is not acquired until it is time to execute the command, and the data broadcasting application that has not yet been acquired is acquired and activated when it is time to execute the command.

[Operation Scenario]

Figure 13:
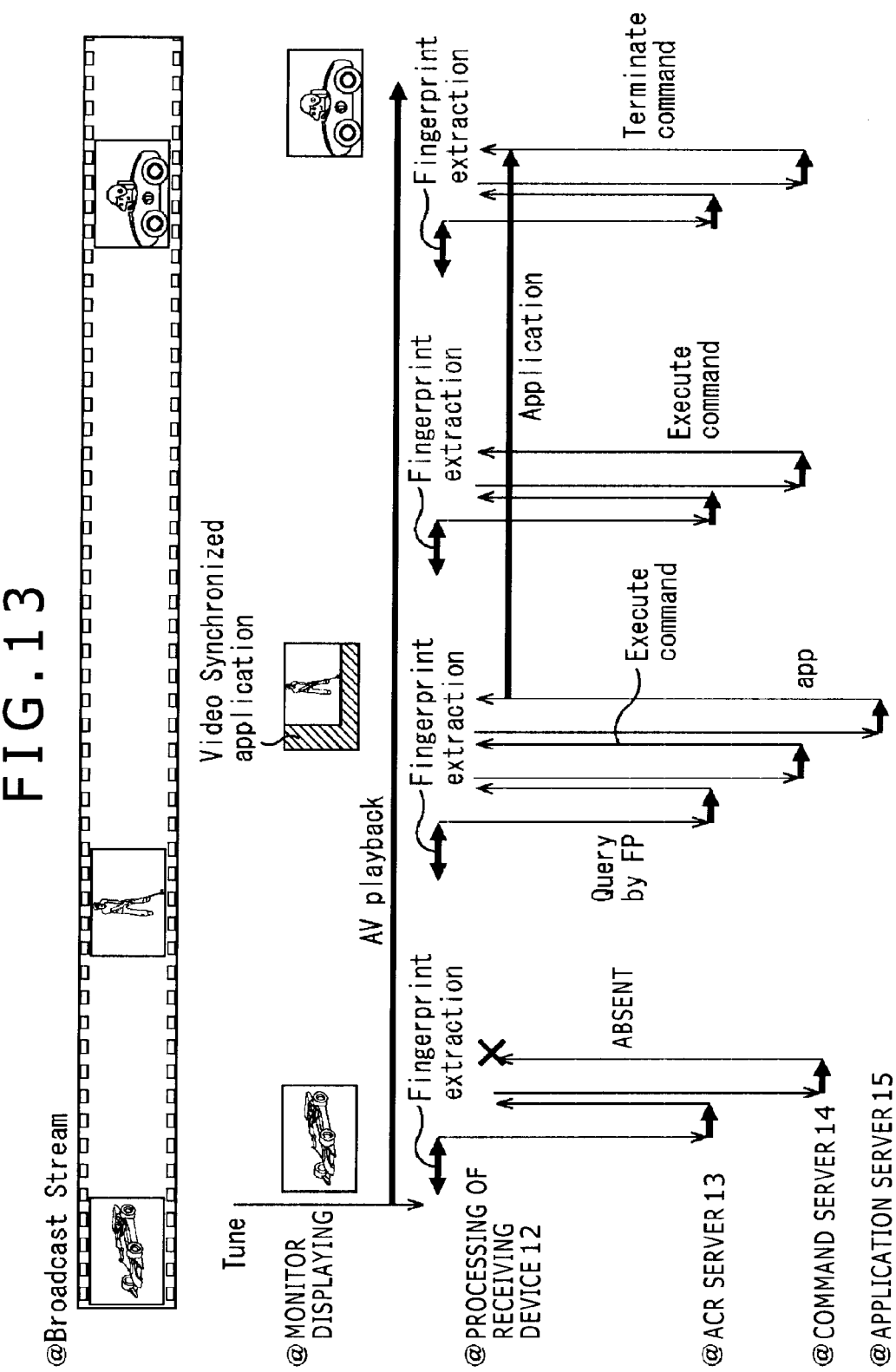
FIG. 13 is a diagram showing an example of an operation scenario.
Figure 14:
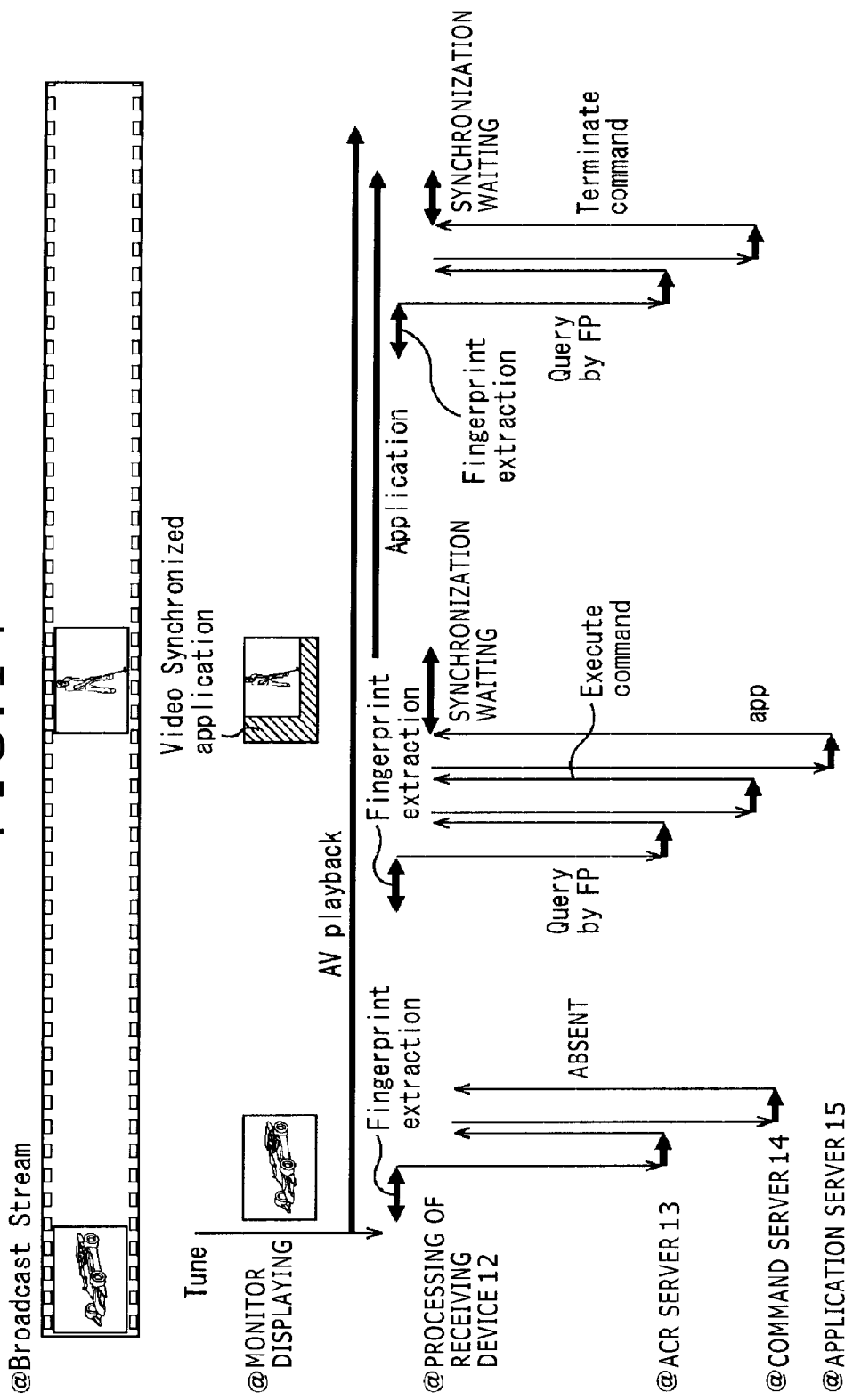
FIG. 14 is a diagram showing an example of the operation scenario.

Executing the above-described command response processing in the receiving device 12 enables an operation of a data broadcasting application like those shown in FIG. 13 and FIG. 14 for example.

FIG. 13 is a diagram showing an example of an operation scenario when the command effective time is not set.

When the digital television show corresponding to a digital television broadcast signal from the broadcasting device 11 is being displayed on a monitor, the receiving device 12 periodically extracts the fingerprint information from video signal and so forth of the currently-selected show and transmits it to the ACR server 13. In the ACR server 13 that has received the fingerprint information, the ACR identification processing is executed and the identification result is transmitted to the receiving device 12.

The receiving device 12 queries the command server 14 about the command in accordance with the identification result from the ACR server 13. If the command that can be executed in the receiving device 12 does not exist, the response from the command server 14 is not performed.

Thereafter, in the receiving device 12, the extraction of the fingerprint information is periodically performed and the query to the ACR server 13 and the command server 14 is also continuously performed in association with it. Then, if the receiving device 12 receives the execute command from the command server 14, the receiving device 12 accesses the application server 15 corresponding to the application URL to acquire and execute a data broadcasting application. Thereby, on the digital television show displayed on the monitor, show-related information ("Video Synchronized application" in the diagram) or the like associated with the data broadcasting application is displayed in a superimposed manner.

Furthermore, in this state, if the execute command is received from the command server 14, the receiving device 12 ignores this execute command because the data broadcasting application has been already activated. Also after that, the extraction of the fingerprint information is continuously performed, and the receiving device 12 stops the running data broadcasting application if the receiving device 12 receives the terminate command from the command server 14. Thereby, on the monitor, the show-related information displayed on the show in a superimposed manner is deleted and only the digital television show is displayed.

In the example of FIG. 13, the execute command and the terminate command are explained as the commands received from the command server 14 in the receiving device 12. However, commands other than those may be received. For example, when a data broadcasting application is running, an event is fired in the running data broadcasting application if the inject event command is received and the running data broadcasting application is suspended if the suspend command is received.

As described above, in the operation scenario of FIG. 13, the command effective time is not set in the command transmitted by the command server 14 and thus the receiving device 12 immediately executes the command received from the command server 14.

FIG. 14 is a diagram showing an example of an operation scenario when the command effective time is set.

In FIG. 14, the receiving device 12 periodically performs extraction of the fingerprint information and accesses the application server 15 corresponding to the application URL to acquire a data broadcasting application if the receiving device 12 receives the execute command from the ACR server 13. Furthermore, because the command effective time is set in this execute command, the receiving device 12 waits for execution of the execute command until it is time to execute the command after acquiring the data broadcasting application ("synchronization waiting" in the diagram). For example, if show-related information associated with the data broadcasting application is displayed in synchronization with a particular scene of a digital television show, the time for the synchronization with this particular scene is described in the command effective time and thus the data broadcasting application is activated after the time at which the command is executed is awaited. This can synchronize the particular scene of the digital television show with the show-related information ("Video Synchronized application" in the diagram).

Also after that, the extraction of the fingerprint information is continuously performed, and the receiving device 12 waits for the time at which the command is executed and then stops the running data broadcasting application if the receiving device 12 receives the terminate command from the command server 14. Thereby, on the monitor, the show-related information displayed on the digital television show in a superimposed manner is deleted and only the show is displayed.

In the example of FIG. 14, the execute command and the terminate command are explained as the commands received from the command server 14 in the receiving device 12. However, commands other than those may be received. For example, if the inject event command is received when a data broadcasting application is running, the time at which the command is executed is awaited and then an event is fired in the running data broadcasting application. Furthermore, if the suspend command is received when a data broadcasting application is running, the time at which the command is executed is awaited and then the running data broadcasting application is suspended.

As described above, in the operation scenario of FIG. 14, the command effective time is set in the command transmitted by the command server 14 and thus the receiving device 12 waits for the time at which the command is executed and then executes the command received from the command server 14. This allows the receiving device 12 to execute the command not depending on the resolution of the extraction of the fingerprint information but at arbitrary timing.

[Operation of Plural Data Broadcasting Applications]

In the above, only the case in which a data broadcasting application is activated in response to the execute command is described. However, it is possible to activate a data broadcasting application without using the execute command.

Figure 15:
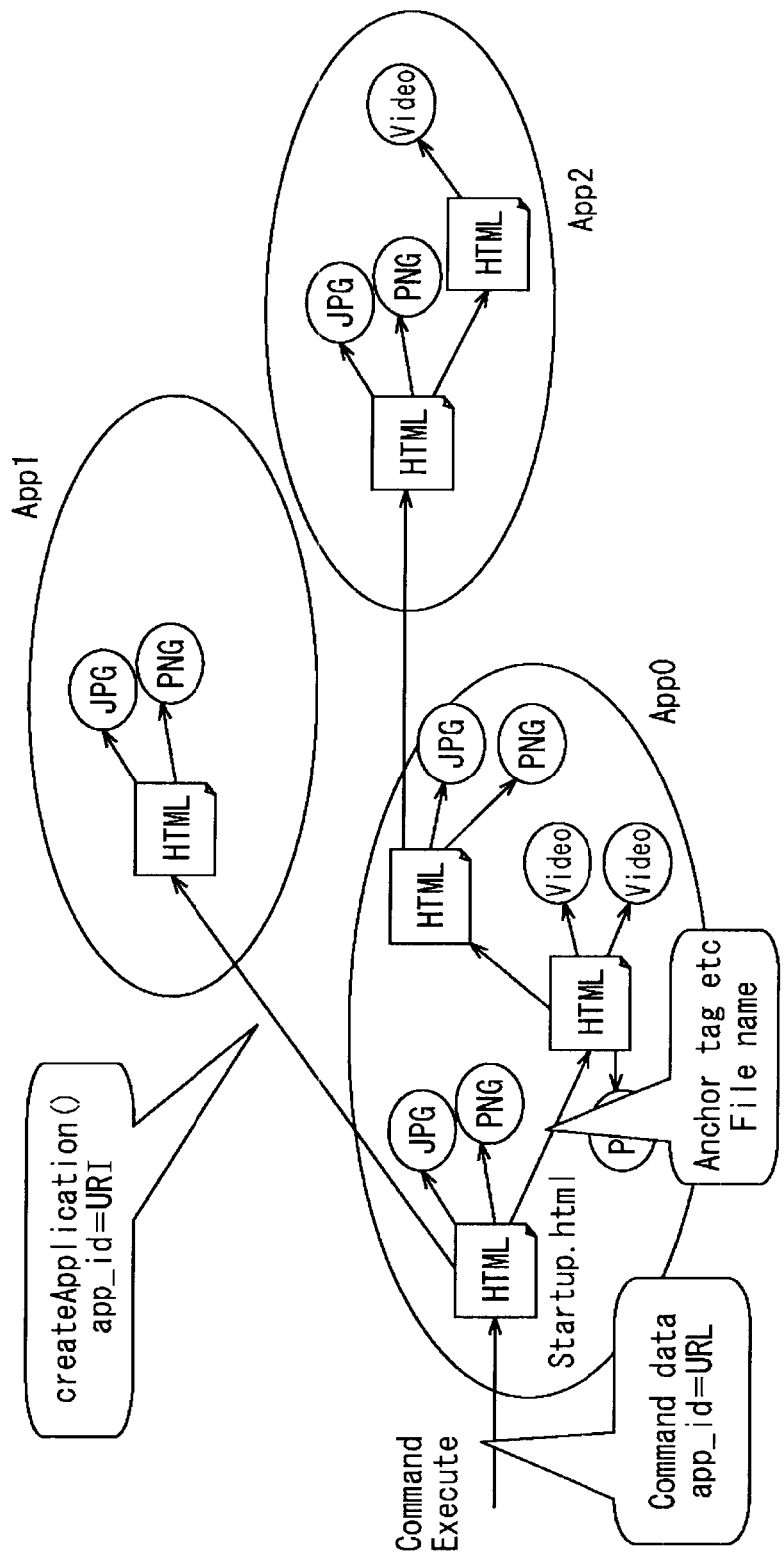
FIG. 15 is a diagram showing the relationship among multi-applications.

Specifically, as shown in FIG. 15, inside a data broadcasting application App0 activated in response to the execute command, functions for activating other data broadcasting applications App1, App2, and so forth are described. This can activate the data broadcasting application App1 and so forth in association with the progression status of the data broadcasting application App0, user's operation for the data broadcasting application App0, and so forth.

Figure 16:
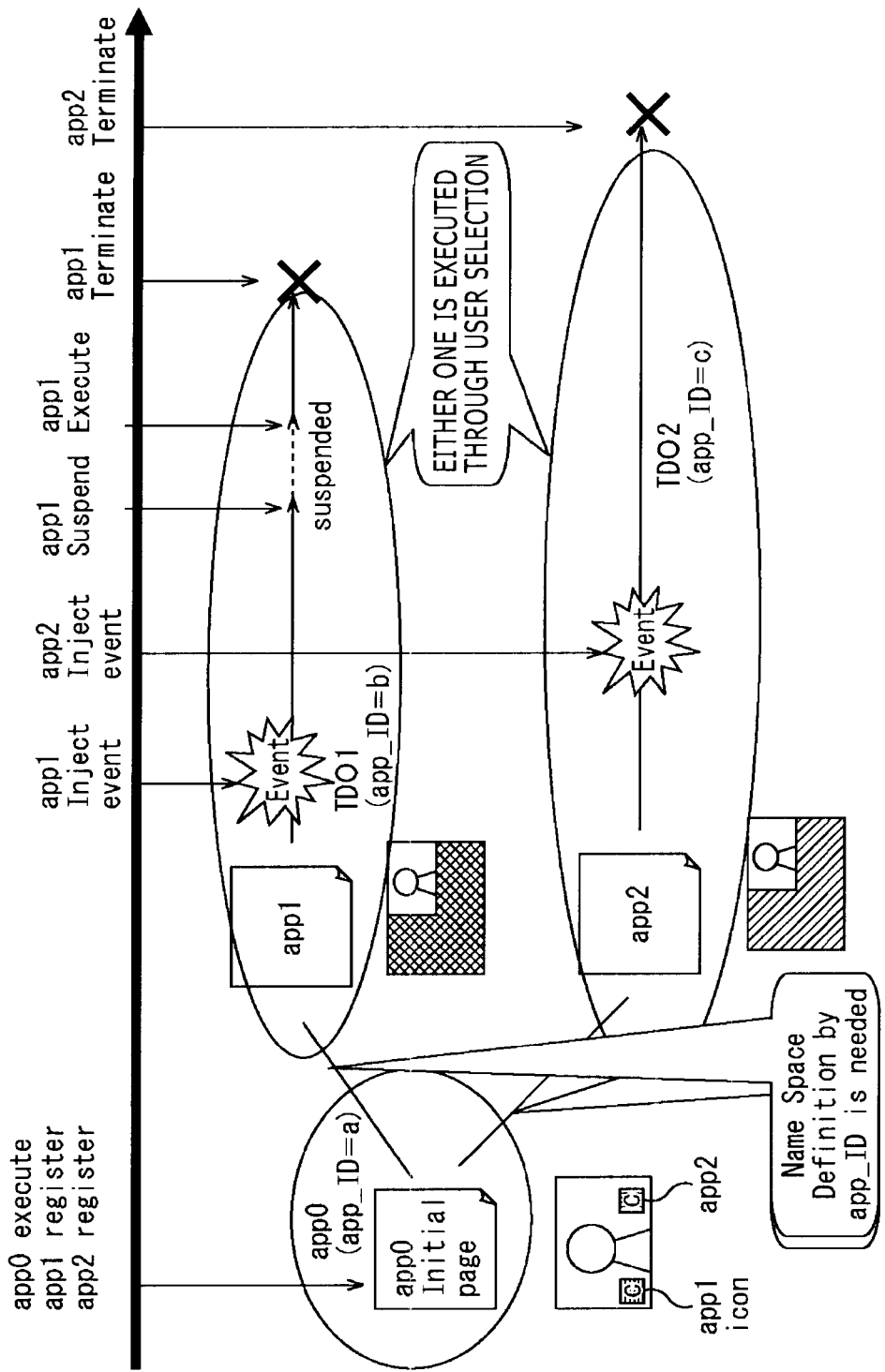
FIG. 16 is a diagram showing an operation example of multi-applications.

FIG. 16 shows an example of an operation in which three data broadcasting applications app0, app1, and app2 are activated in cooperation.

First, the execute command for the data broadcasting application app0, the register command for the data broadcasting application app1, and the register command for the data broadcasting application app2 are broadcast. In the receiving device 12 that has received them, the data broadcasting application app0 is acquired and registered to be activated. On the screen of the executed data broadcasting application app0, icons corresponding to the data broadcasting applications app1 and app2, respectively, are displayed. Simultaneously with that, the data broadcasting applications app1 and app2 are acquired and registered.

If the user selects the icon corresponding to the data broadcasting application app1 displayed on the screen of the data broadcasting application app0, the running data broadcasting application app0 is stopped and the data broadcasting application app1 is activated. Thereafter, event firing, suspension, resumption, and stop of the data broadcasting application app1 are carried out in response to the inject event command, the suspend command, the execute command, and the terminate command, respectively, for the running data broadcasting application app1.

If the user selects the icon corresponding to the data broadcasting application app2 displayed on the screen of the data broadcasting application app0, the running data broadcasting application app0 is stopped and the data broadcasting application app2 is activated. Thereafter, event firing and stop of the data broadcasting application app2 are carried out in response to the inject event command and the terminate command, respectively, for the running data broadcasting application app2.

According to the above-described operation, it is possible to activate plural data broadcasting applications in cooperation without using the execute command.

[Specific Operation Example]

Furthermore, according to the present technique, identification of AV content is performed by the ACR server 13 without metadata corresponding to the AV content. Thus, for example the following operation is possible.

Figure 17:
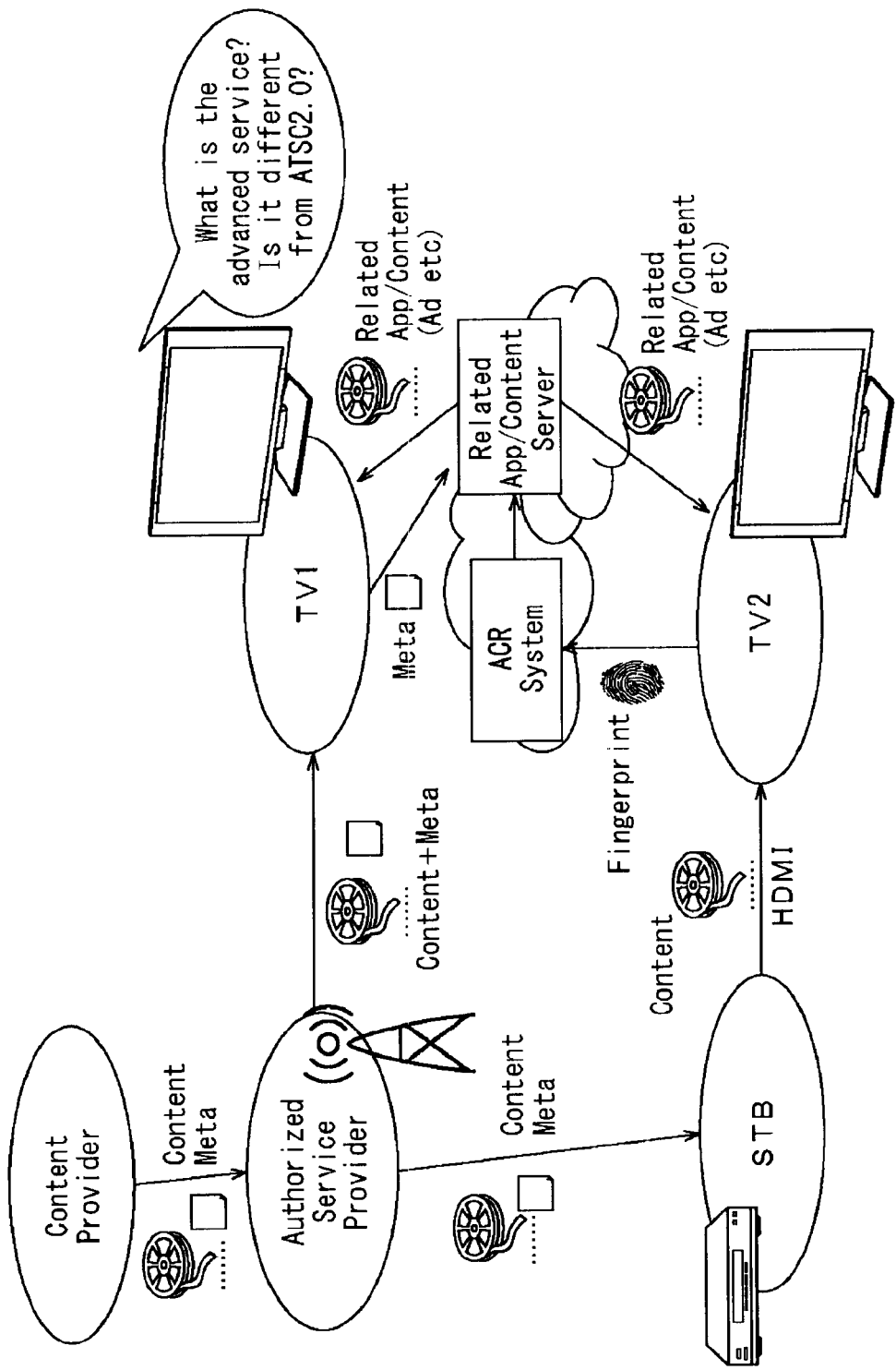
FIG. 17 is a diagram showing a specific example of a broadcasting system to which the present technique is applied.

FIG. 17 is a diagram showing a specific example of a broadcasting system to which the present technique is applied.

As shown in FIG. 17, metadata relating to a digital television show is given to AV content provided from a content provider (Content Provider), and a receiving device ("TV1" in the diagram) that directly receives a digital television broadcast signal from an ASP (Authorized Service Provider) can acquire the metadata transmitted together with the AV content. Therefore, this receiving device can acquire and execute a data broadcasting application by accessing an application server ("Server" in the diagram) managed by a broadcast station or the like based on the metadata.

On the other hand, in the case of receiving the digital television broadcast signal from the ASP via a CATV network, a satellite communication network, etc., a signal resulting from conversion by a set top box ("STB (Set Top Box)" in the diagram) is received by a receiving device ("TV2" in the diagram) via the HDMI (High Definition Multimedia Interface). In this case, the output from the set top box is only AV content and metadata cannot be utilized. Therefore, this receiving device can acquire a data broadcasting application from the application server ("Server" in the diagram) and execute it by transmitting the fingerprint information ("Fingerprint" in the diagram) extracted from the AV content to an ACR server ("ACR System" in the diagram).

As described above, also when a digital television show is retransmitted via a CATV network, a satellite communication network, etc., a service of data broadcasting content that can be in conjunction with the show can be realized.

Specifically, in the above description, for example as shown in FIG. 1, the example in which the receiving device 12 directly receives a digital television broadcast signal from the broadcasting device 11 is shown. However, the present technique is more effective when being applied to the case in which metadata transmitted together with AV content cannot be sent to a receiving device due to use of a set top box etc. like a CATV network, a satellite communication network, etc.

<Second Embodiment>

[Configuration Example of Communication System]

In the above description, the example in which the receiving device 12 receives a digital television broadcast signal of AV content transmitted (broadcast) from the broadcasting device 11 is explained. However, the AV content may be delivered via the Internet 16.

Figure 18:
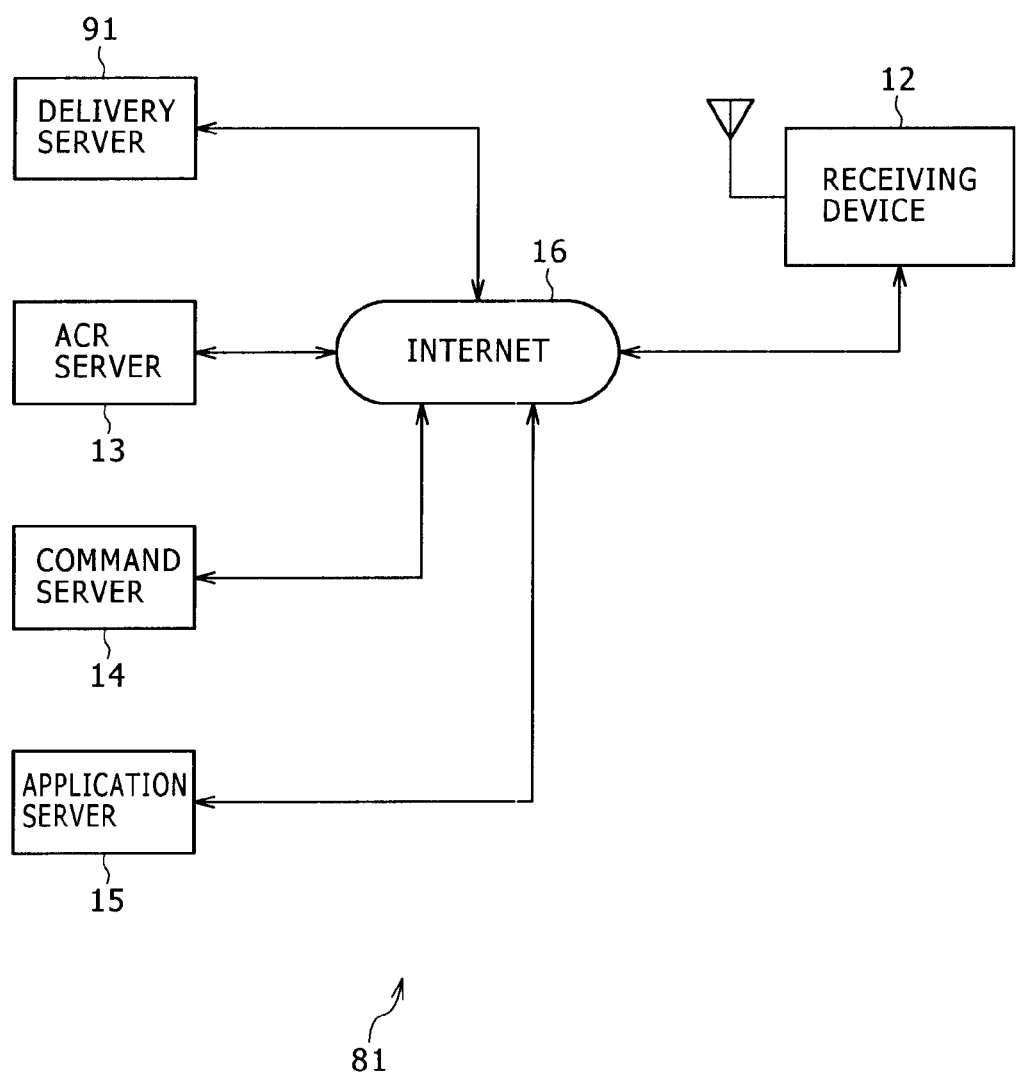
FIG. 18 is a diagram showing a configuration example of a communication system.

FIG. 18 shows a communication system 81 that is the present embodiment.

In FIG. 18, the place corresponding to FIG. 1 is given the same numeral and its description is accordingly omitted.

Specifically, in FIG. 18, a delivery server 91 connected to the Internet 16 is provided instead of the broadcasting device 11 when comparison from FIG. 1 is made. The delivery server 91 delivers AV content to the receiving device 12 via the Internet 16 in response to a request from the receiving device 12.

The receiving device 12 extracts the fingerprint information from video signal and audio signal of the AV content from the delivery server 91 and transmits it to the ACR server 13. In the ACR server 13, ACR identification processing is executed. Here, as the identification result, content identification information, time position information, and command provider information are transmitted. Specifically, although the channel number information is obtained as the identification result when AV content from the broadcasting device 11 is acquired, the content identification information such as the content ID is obtained as the identification result when AV content from the delivery server 91 is acquired.

The receiving device 12 accesses the command server 14 corresponding to the URL described in the command provider information and transmits the content identification information and the time position information to thereby query the command that can be executed in the receiving device 12. Then, the receiving device 12 controls the operation of a data broadcasting application in accordance with a command from the command server 14.

In this manner, the receiving device 12 does not only receive AV content via a broadcast network but can receive it via a communication network. Furthermore, AV content is identified by the ACR server 13 whether it is received from the broadcast network or the communication network. Therefore, the receiving device 12 can acquire the command according to the identification result from the command server 14.

In the above description, the example in which plural servers such as the ACR server 13, the command server 14, and the application server 15 are provided for each of offered functions is explained. However, all or part of these functions may be collected and offered by one or plural servers.

Furthermore, the ACR server 13 may transmit the identification result directly to the command server 14 without transmitting it to the receiving device 12. For example, when the receiving device 12 transmits the fingerprint information to the ACR server 13, the ACR server 13 executes ACR identification processing and transmits the identification result to the command server 14. Then, the command server 14 transmits a command to the receiving device 12 in accordance with the identification result from the ACR server 13. This enables an operation in which the receiving device 12 acquires a command from the command server 14 by merely transmitting the fingerprint information to the ACR server 13. Moreover, the command server 14 may transmits the acquisition command of a data broadcasting application directly to the application server 15 without transmitting it to the receiving device 12. This enables e.g. an operation in which the receiving device 12 acquires the data broadcasting application from the application server 15 upon transmitting the fingerprint information to the ACR server 13.

[Description of Computer to which the Present Technique is Applied]

The above-described series of processing can be executed by hardware and can also be executed by software. In the case of executing the series of processing by software, a program configuring the software is installed into a general-purpose computer or the like.

Figure 19:
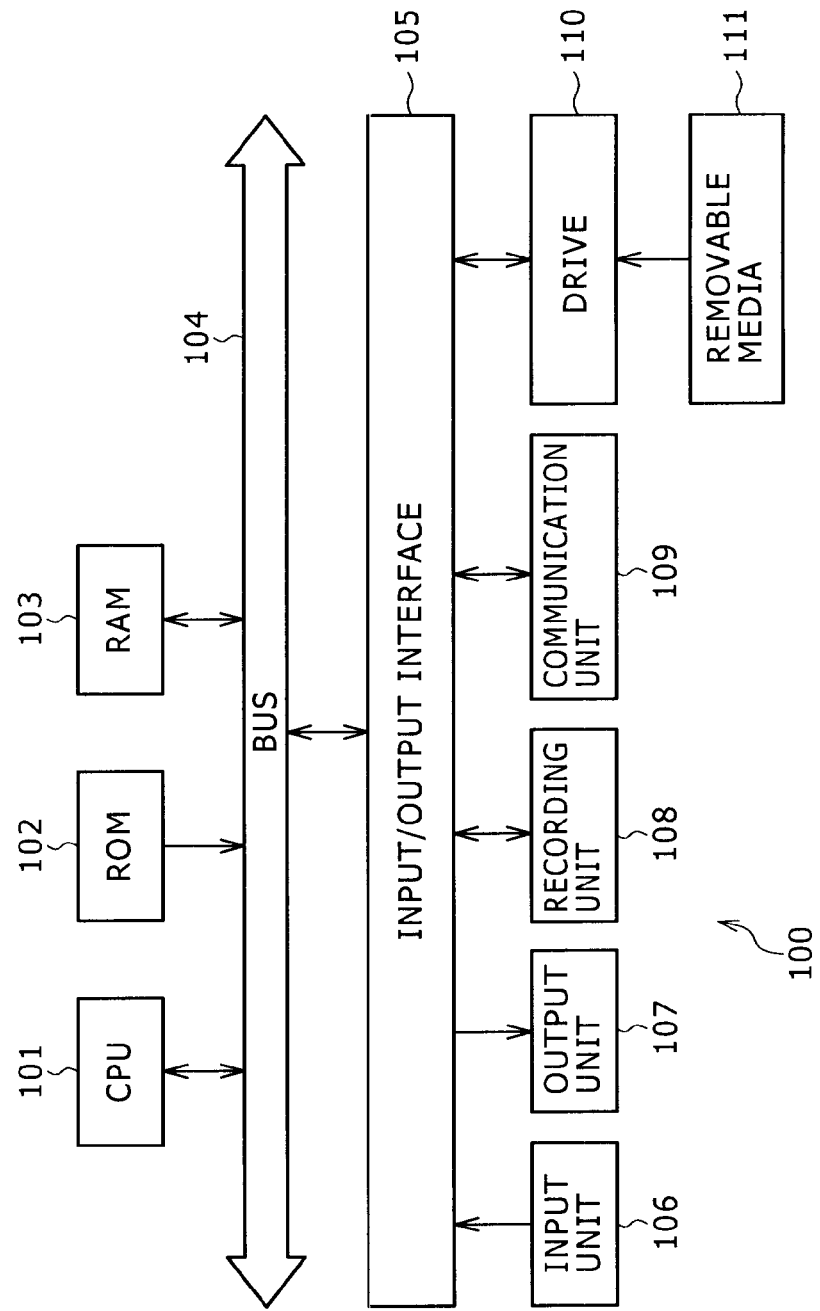
FIG. 19 is a diagram showing a configuration example of a computer.

So, FIG. 19 shows a configuration example of one embodiment of the computer into which the program to execute the above-described series of processing is installed.

The program can be recorded in advance in a recording unit 108 such as a hard disc or a ROM (Read Only Memory) 102 incorporated in a computer 100.

Alternatively, the program can be stored (recorded) temporarily or permanently in removable media 111 such as flexible disc, CD-ROM (Compact Disc Read Only Memory), MO (Magneto Optical) disc, DVD (Digital Versatile Disc), magnetic disc, and semiconductor memory. Such removable media 111 can be provided as so-called package software.

Besides the installation from the above-described removable media 111 into the computer 100, the program can be wirelessly transferred from a download site to the computer 100 via an artificial satellite for digital satellite broadcasting or can be transferred to the computer 100 by wiring via a network such as a LAN (Local Area Network) or the Internet. In the computer 100, the thus transferred program can be received by a communication unit 109 and installed into the recording unit 108.

The computer 100 includes a CPU (Central Processing Unit) 101. To the CPU 101, an input/output interface 105 is connected via a bus 104. When an instruction is input via the input/output interface 105 through operation of an input unit 106 composed of keyboard, mouse, microphone, etc. by the user and so forth, the CPU 101 runs a program stored in the ROM 102 in accordance with it. Alternatively, the CPU 101 loads, in a RAM (Random Access Memory) 103, and runs a program stored in the recording unit 108, a program that is transferred from a satellite or a network to be received by the communication unit 109 and installed into the recording unit 108, or a program that is read out from the removable media 111 loaded in a drive 110 and installed into the recording unit 108. Thereby, the CPU 101 executes processing in accordance with the above-described flowchart or processing executed based on the configuration of the above-described block diagram. Subsequently, according to need, for example the CPU 101 makes the processing result be output from an output unit 107 composed of LCD (Liquid Crystal Display), speaker, etc. or transmitted from the communication unit 109 and recorded in the recording unit 108, and so forth, via the input/output interface 105.

Here, in the present specification, the processing steps that describe the program for making the computer 100 execute various kinds of processing do not necessarily need to be processed in a time-series manner along the order described as the flowchart and encompass also processing executed in parallel or individually (e.g. parallel processing or processing by an object).

Furthermore, the program may be one processed by one computer or may be one subjected to distributed processing by plural computers. Moreover, the program may be one transferred to a distant computer and executed.

In the present specification, the system refers to the whole of a device composed of plural devices.

Furthermore, embodiments of the present technique are not limited to the above-described embodiments, and various changes are possible in such a range as not to depart from the gist of the present technique.

Moreover, it is also possible for the present technique to have the following configurations.

[1]
A receiving device including:
a receiver configured to receive AV content;
a feature extractor configured to extract a feature from data of the received AV content;
an identification result acquirer configured to acquire an identification result of the AV content identified from the extracted feature by using an ACR (Automatic Content Recognition) technique;
a command acquirer configured to acquire a command for controlling operation of an application program run in conjunction with the AV content in accordance with the acquired identification result; and
a controller configured to control operation of the application program in accordance with the acquired command.

[2]
The receiving device according to [1], wherein:
the command indicates any of acquisition or registration, acquisition or activation, event firing, interruption, or stop of the application program; and
the controller controls acquisition or registration, or acquisition or activation of the application program, or event firing, suspension, and stop of the application program that is running, in accordance with each command.

[3]
The receiving device according to [1] or [2], wherein:
time information indicating time at which the command is executed is included in the command; and
the controller executes the command in accordance with the time information.

[4]
The receiving device according to [3], wherein
the time information is information for executing the command at specific time set in advance irrespective of progression of the AV content or information for executing the command when specific time set in advance elapses in conjunction with progression of the AV content.

[5]
The receiving device according to [3] or [4], wherein
the controller acquires the application program and then activates the acquired application program when it is time to execute the command, if the command indicates acquisition or activation and the application program is not acquired.

[6]
The receiving device according to any of [1] to [5], wherein
the feature extractor extracts the feature from either one or both of a video signal and an audio signal of the AV content.

[7]
A receiving method including the steps of, by a receiving device:
receiving AV content;
extracting a feature from data of the received AV content;
acquiring an identification result of the AV content identified from the extracted feature by using an ACR technique;
acquiring a command for controlling operation of an application program run in conjunction with the AV content in accordance with the acquired identification result; and
controlling operation of the application program in accordance with the acquired command.

[8]
A program for causing a computer to function as:
a receiver configured to receive AV content;
a feature extractor configured to extract a feature from data of the received AV content;
an identification result acquirer configured to acquire an identification result of the AV content identified from the extracted feature by using an ACR technique;
a command acquirer configured to acquire a command for controlling operation of an application program run in conjunction with the AV content in accordance with the acquired identification result; and
a controller configured to control operation of the application program in accordance with the acquired command.

[9]
An information processing system composed of a receiving device, a first information processing device, a second information processing device, and a third information processing device,
wherein:
the receiving device includes a receiver configured to receive AV content,
a feature extractor configured to extract a feature from data of the received AV content,
an identification result acquirer configured to transmit the extracted feature to the first information processing device and acquire an identification result of the AV content identified from the feature by using an ACR technique in the first information processing device,
a command acquirer configured to transmit the identification result acquired from the first information processing device to the second information processing device and acquire, from the second information processing device, a command for controlling operation of an application program run in conjunction with the AV content in accordance with the identification result, and
a controller configured to control operation of the application program acquired from the third information processing device in accordance with the command acquired from the second information processing device;
the first information processing device includes
a content identifier configured to identify the AV content from the feature by using the ACR technique in response to a query from the receiving device;
the second information processing device includes
a command provider configured to provide the command in accordance with the identification result in response to a query from the receiving device; and
the third information processing device includes
an application provider configured to provide the application program in accordance with the command in response to a query from the receiving device.

It should be understood by those skilled in the art that various modifications, combinations, sub-combinations and alterations may occur depending on design requirements and other factor in so far as they are within the scope of the appended claims or the equivalents thereof.

What is claimed is:

1. A receiving device comprising:
   circuitry configured to:
   receive audio video content,
   extract a feature from data of the received audio video content,
   provide the extracted feature to an Automatic Content Recognition (ACR) server,
   receive, from the ACR server, a response which is based on an identification result of the audio video content identified from the extracted feature by using an ACR technique,
   request and acquire a command from a command server corresponding to a location identified in the response from the ACR server,
   request and acquire an application from an application server corresponding to a remote location of the application received from the command server, and
   control operation of the application program, which is programmed to run in conjunction with the audio video content, in accordance with the command that is retrieved via a communication network from the location identified in the response from the ACR server, wherein
   the ACR server, the command server, and the application server are distinct servers.

2. The receiving device according to claim 1, wherein:
   the command indicates any of acquisition or registration, acquisition or activation, event firing, interruption, or stop of the application program; and
   the circuitry controls acquisition or registration, or acquisition or activation of the application program, or event firing, suspension, or stop of the application program that is running, in accordance with each command.

3. The receiving device according to claim 1, wherein
   the circuitry extracts the feature from either one or both of a video signal and an audio signal of the audio video content.

4. The receiving device according to claim 1, wherein the remote location includes a domain part, which references an Internet domain name and a directory path.

5. The receiving device according to claim 1, wherein the circuitry is further configured to
   activate the application program when the acquired command is an execute command,
   suspend execution of the application program when the acquired command is a suspend command, and
   terminate execution of the application program when the acquired command is a terminate command.

6. The receiving device according to claim 1, wherein:
   the ACR server, the command server, and the application server are physically distinct servers.

7. The receiving device according to claim 2, wherein:
   time information indicating time at which the command is executed is included in the command; and
   the circuitry executes the command in accordance with the time information.

8. The receiving device according to claim 7, wherein
   the time information is information for executing the command at specific time set in advance irrespective of progression of the audio video content or information for executing the command when a specific time set in advance elapses in conjunction with progression of the audio video content.

9. The receiving device according to claim 7, wherein
   the circuitry acquires the application program and then activates the acquired application program when it is time to execute the command, if the command indicates acquisition or activation and the application program is not acquired.

10. A method of a receiving device for controlling an application program, the method comprising:
    receiving audio video content;
    extracting a feature from data of the received audio video content;
    providing the extracted feature to an Automatic Content Recognition (ACR) server,
    receiving, from the ACR server, a response which is based on an identification result of the audio video content identified from the extracted feature by using an ACR technique,
    requesting and acquiring, by circuitry of the receiving device, a command from a command server corresponding to a location identified in the response from the ACR server,
    requesting and acquiring, by circuitry of the receiving device, an application from an application server corresponding to a remote location of the application received from the command server, and
    controlling, by the circuitry of the receiving device, operation of an application program, which is programmed to run in conjunction with the audio video content, in accordance with the command that is retrieved via a communication network from the location identified in the response from the ACR server, wherein
    the ACR server, the command server, and the application server are distinct servers.

11. The method according to claim 10, wherein:
the ACR server, the command server, and the application server are physically distinct servers.

12. A non-transitory computer-readable storage medium storing a program for causing a computer to:
receive audio video content;
extract a feature from data of the received audio video content;
provide the extracted feature to an Automatic Content Recognition (ACR) server,
receive, from the ACR server, a response which is based on an identification result of the audio video content identified from the extracted feature by using an ACR technique,
request and acquire a command from a command server corresponding to a location identified in the response from the ACR server,
request and acquire an application from an application server corresponding to a remote location of the application received from the command server, and
control operation of the application program, which is programmed to run in conjunction with the audio video content, in accordance with the command that is retrieved via a communication network from the location identified in the response from the ACR server, wherein
the ACR server, the command server, and the application server are distinct servers.

13. The non-transitory computer-readable storage medium according to claim 12, wherein:
the ACR server, the command server, and the application server are physically distinct servers.

14. An information processing system, comprising:
a receiving device, a first information processing subsystem, a second information processing subsystem, and a third information processing subsystem, wherein
the receiving device includes circuitry configured to:
receive audio video content,
extract a feature from data of the received audio video content,
provide the extracted feature to the first information processing subsystem,
receive, from the first information processing subsystem, a response which is based on an identification result of the audio video content identified from the extracted feature by using an ACR technique,
request and acquire a command from the second information processing subsystem corresponding to a location identified in the response from the first information processing subsystem,
request and acquire an application from a third information processing subsystem corresponding to a remote location of the application received from the second information processing subsystem, and
control operation of the application program, which is programmed to run in conjunction with the audio video content, in accordance with the command acquired from the second information processing subsystem via a communication network from the location identified in the response from the first information processing subsystem;
the first information processing subsystem is an Automatic Content Recognition (ACR) server and includes circuitry configured to:
identify the audio video content from the feature by using the ACR technique in response to a query from the receiving device;
the second information processing subsystem is a command server and includes circuitry configured to:
provide the command to the receiving device;
the third information processing subsystem is an application server and includes circuitry configured to
provide the application program in response to a query from the receiving device; and
the ACR server, the command server, and the application server are distinct servers.

15. The information processing system according to claim 14, wherein:
the ACR server, the command server, and the application server are physically distinct servers.

* * * * *